US012430988B2

(12) United States Patent
Abrahamson

(10) Patent No.: US 12,430,988 B2
(45) **Date of Patent: *Sep. 30, 2025**

(54) WHEEL BONUS SYSTEM FOR GAMES

(71) Applicant: AGS LLC, Las Vegas, NV (US)

(72) Inventor: Jamie Abrahamson, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 299 days.

This patent is subject to a terminal disclaimer.

(21) Appl. No.: 17/940,221

(22) Filed: Sep. 8, 2022

(65) Prior Publication Data

US 2023/0005332 A1 Jan. 5, 2023

Related U.S. Application Data

(63) Continuation-in-part of application No. 17/331,619, filed on May 26, 2021, now Pat. No. 11,954,976, which is a continuation-in-part of application No. 17/004,974, filed on Aug. 27, 2020, now Pat. No. 11,532,209, which is a continuation-in-part of application No. 15/936,400, filed on Mar. 26, 2018, now Pat. No. 10,769,892.

(60) Provisional application No. 62/539,576, filed on Aug. 1, 2017.

(51) Int. Cl.
*G07F 17/32* (2006.01)
*G07F 17/34* (2006.01)

(52) U.S. Cl.
CPC ...... *G07F 17/3244* (2013.01); *G07F 17/3267* (2013.01); *G07F 17/3272* (2013.01); *G07F 17/34* (2013.01)

(58) Field of Classification Search
CPC ............ G07F 17/3213; G07F 17/3244; G07F 17/3211; G07F 17/3297; G07F 17/34; A63F 2003/00164; A63F 3/00157; A63F 5/02
See application file for complete search history.

(56) References Cited

U.S. PATENT DOCUMENTS

| | | | |
|---|---|---|---|
| 5,292,127 | A | 3/1994 | Kelly et al. |
| 5,318,298 | A | 6/1994 | Kelly et al. |
| 5,409,225 | A | 4/1995 | Kelly et al. |
| 5,584,763 | A | 12/1996 | Kelly et al. |

(Continued)

*Primary Examiner* — William H McCulloch, Jr.
(74) *Attorney, Agent, or Firm* — Endurance Law Group PLC; James R. Yee

(57) ABSTRACT

A bonus providing device, including a bonus providing element, distinct from underlying game play that enables a plurality of players unique benefits to an underlying game winning outcome or triggering outcome is provided. The bonus providing element provides indications of at least three individual random indicators, wherein at least two of the at least three individual random indicators are linear, each one of the plurality of players being associated with a player station, the player stations being divided into a plurality of groups, with a predetermined number of player stations being associated with each of the groups, The three individual random indicators including an identification of a randomly selected one of the groups, an identification of a randomly selected one of the player stations associated with the randomly selected one of the groups, and an identification of a randomly selected parameter associated with a bonus award.

19 Claims, 22 Drawing Sheets

(56) References Cited

U.S. PATENT DOCUMENTS

| | | | | |
|---|---|---|---|---|
| 5,700,007 | A | | 12/1997 | Kelly et al. |
| 5,707,285 | A | | 1/1998 | Place et al. |
| 5,722,891 | A | | 3/1998 | Inoue |
| 5,743,523 | A | | 4/1998 | Kelly et al. |
| 5,743,800 | A | * | 4/1998 | Huard ..................... G07F 17/32 463/16 |
| 5,788,573 | A | | 8/1998 | Baerlocher et al. |
| 5,848,932 | A | | 12/1998 | Adams |
| 5,967,514 | A | | 10/1999 | Kelly et al. |
| 6,089,978 | A | | 7/2000 | Adams |
| 6,244,595 | B1 | | 6/2001 | Kelly et al. |
| 6,334,814 | B1 | | 1/2002 | Adams |
| 6,446,964 | B1 | | 9/2002 | Kelly et al. |
| 6,491,296 | B2 | | 12/2002 | Kelly et al. |
| 6,533,273 | B2 | | 3/2003 | Cole et al. |
| 6,612,574 | B1 | | 9/2003 | Cole et al. |
| 6,612,575 | B1 | | 9/2003 | Cole et al. |
| 6,663,488 | B1 | | 12/2003 | Adams |
| 6,676,517 | B2 | | 1/2004 | Beavers |
| 6,692,355 | B2 | | 2/2004 | Baerlocher et al. |
| 6,705,944 | B2 | | 3/2004 | Luciano |
| 6,827,646 | B2 | | 12/2004 | Adams |
| 7,011,581 | B2 | | 3/2006 | Cole et al. |
| 7,100,916 | B2 | | 9/2006 | Kelly et al. |
| 7,235,011 | B2 | | 6/2007 | Randall et al. |
| 7,278,635 | B2 | | 10/2007 | Kelly et al. |
| 7,311,598 | B2 | | 12/2007 | Kaminkow et al. |
| 7,322,886 | B2 | | 1/2008 | Manz |
| 7,618,316 | B2 | | 11/2009 | Cole et al. |
| 7,651,394 | B2 | | 1/2010 | Johnson |
| 7,931,532 | B2 | | 4/2011 | Johnson |
| 7,963,847 | B2 | | 6/2011 | Baerlocher |
| 8,021,230 | B2 | | 9/2011 | Baerlocher et al. |
| 8,221,214 | B2 | | 7/2012 | Nicely |
| 8,342,941 | B2 | | 1/2013 | Nicely |
| 8,360,844 | B2 | | 1/2013 | Schwartz et al. |
| 8,460,082 | B2 | | 6/2013 | Harris |
| 8,932,125 | B1 | | 1/2015 | Harris |
| 8,956,213 | B2 | | 2/2015 | Manz et al. |
| 9,111,414 | B1 | | 8/2015 | Sirois et al. |
| 9,292,996 | B2 | | 3/2016 | Davis et al. |
| 9,401,064 | B2 | | 7/2016 | Young |
| 9,662,563 | B2 | | 5/2017 | Asdale et al. |
| 9,972,169 | B2 | | 5/2018 | Davis et al. |
| 9,997,013 | B2 | | 6/2018 | Litman |
| 10,204,486 | B2 | | 2/2019 | Asdale et al. |
| 10,275,993 | B1 | * | 4/2019 | Charlton ............... G07F 17/329 |
| 10,311,681 | B2 | | 6/2019 | Litman |
| 10,769,892 | B2 | | 9/2020 | Abrahamson |
| 11,954,976 | B2 | * | 4/2024 | Abrahamson ........... A63F 5/045 |
| 2002/0042294 | A1 | | 4/2002 | Pau et al. |
| 2003/0100361 | A1 | | 5/2003 | Sharpless et al. |
| 2003/0236110 | A1 | * | 12/2003 | Beaulieu ................. A63F 13/12 463/1 |
| 2005/0059471 | A1 | | 3/2005 | Cannon |
| 2005/0119039 | A1 | | 6/2005 | Berman et al. |
| 2005/0119042 | A1 | | 6/2005 | Chamberlain et al. |
| 2006/0009278 | A1 | | 1/2006 | Vancura |
| 2006/0033268 | A1 | | 2/2006 | Wong |
| 2006/0082057 | A1 | | 4/2006 | Luciano et al. |
| 2007/0054723 | A1 | | 3/2007 | Mattice et al. |
| 2007/0060239 | A1 | | 3/2007 | Nelson et al. |
| 2007/0072668 | A1 | | 3/2007 | Hein et al. |
| 2007/0117608 | A1 | | 5/2007 | Roper et al. |
| 2007/0135204 | A1 | | 6/2007 | Nicely |
| 2008/0128986 | A1 | | 6/2008 | Morris et al. |
| 2008/0146309 | A1 | | 6/2008 | Bennett |
| 2009/0075715 | A1 | | 3/2009 | Coleman et al. |
| 2009/0203428 | A1 | * | 8/2009 | Okada ................. G07F 17/3262 463/20 |
| 2009/0239650 | A1 | * | 9/2009 | Alderucci ............ G06Q 20/207 463/25 |
| 2011/0059789 | A1 | | 3/2011 | Luciano |
| 2012/0122545 | A1 | | 5/2012 | Watkins et al. |
| 2012/0142410 | A1 | | 6/2012 | Olive et al. |
| 2012/0322546 | A1 | | 12/2012 | Lalumière et al. |
| 2013/0029758 | A1 | | 1/2013 | Berman et al. |
| 2013/0143640 | A1 | | 6/2013 | Young |
| 2014/0113712 | A1 | | 4/2014 | Asdale |
| 2014/0378205 | A1 | | 12/2014 | Montenegro et al. |
| 2015/0170460 | A1 | | 6/2015 | Marais |
| 2015/0258425 | A1 | | 9/2015 | Fisher et al. |
| 2015/0265913 | A1 | | 9/2015 | Fisher et al. |
| 2016/0125689 | A1 | | 5/2016 | Hoffman et al. |
| 2016/0155296 | A1 | | 6/2016 | Baron et al. |
| 2019/0043314 | A1 | | 2/2019 | Abrahamson |
| 2019/0347908 | A1 | * | 11/2019 | Bolling, Jr. ............. G07F 17/34 |
| 2020/0394874 | A1 | | 12/2020 | Abrahamson |
| 2021/0312761 | A1 | | 10/2021 | Abrahamson |
| 2023/0005332 | A1 | * | 1/2023 | Abrahamson ....... G07F 17/3288 |

* cited by examiner

* Circles can be color coded
* Illuminated when player participates

WHEEL BONUS SYSTEM FOR GAMES

CROSS REFERENCE TO RELATED APPLICATIONS

This application is a continuation-in-part of U.S. application Ser. No. 17/331,619, filed May 26, 2021, which is a continuation-in-part of U.S. application Ser. No. 17/004,974, filed Aug. 27, 2020, which is a continuation of U.S. application Ser. No. 15/936,400, filed Mar. 26, 2018, now U.S. Pat. No. 10,769,892, which claims priority to U.S. Provisional Patent Application Ser. No. 62/539,576, filed Aug. 1, 2017. The present application claims priority to each of said applications and incorporates by reference each of said applications as if set forth fully herein.

BACKGROUND OF THE INVENTION

Field of the Invention

The present disclosure relates to the field of casino table games and bonus outcomes on the casino table games when predetermined event outcomes occur in an underlying casino table game.

Background of the Invention

Many different systems and configuration have been attempted to provide bonus events in casino table gaming systems. Each of these have their benefits and detractions. For example, a single wheel with a single bonus event indicator on it, like a simple candy wheel, that can be spun after a player has a winning outcome. It is used to benefit a single pre-identified player after a winning event has occurred.

BRIEF SUMMARY OF THE INVENTION

Aspects of the disclosure comprise a bonus providing element (BPE) which is distinct from underlying game play, and methods and systems for triggering a BPE. In certain examples, the BPE enables individual players unique benefits to an underlying game when winning outcomes or triggering outcomes occur.

In certain examples, a bonus providing element distinct from an underlying game enables bonus awards to players at two or more player positions of the underlying game based upon receipt of a predetermined triggering outcome or event in the underlying game, by the bonus providing element providing an indication of at least three individual random indicators, such as: a) a first random indicator configured to provide an identification of a first award to be awarded to qualifying players of the players of the underlying game; b) a second random indicator configured to provide an identification of a single one of the two or more player positions; and c) a third random indicator configured to provide an identification of a second award to be awarded to the player at the single one of the two or more player positions indicated by the second random indictor.

In certain examples, the bonus providing element comprises a plurality of wheels, such as concentric wheels, wherein each wheel includes a plurality of segments or sectors.

In certain examples, the qualifying players comprise players of the underlying game that have placed a wager, such as a side wager.

In certain examples, the bonus providing element is activated when a community event trigger occurs in the underlying game.

In certain examples, the third indicator, such as a third concentric wheel, is only activated when the selected one of the player positions is a qualifying player.

In certain examples, the bonus providing element is presented as a graphical representation on a video display. The underlying game may comprise at least one of: a game presented at an electronic gaming table, an online game, a mobile game and a game presented at physical gaming table.

In certain examples, the first award is awarded to all qualifying players except the selected single one of the players that is awarded the second award.

Another example of the disclosure comprises a system and method for activating a bonus providing element, including selecting a triggering event therefore. In certain examples, the system may comprise a controller; at least one input device configured to provide an output to the controller regarding the underlying game; a memory; at least one display device; and machine-readable code stored in the memory and executable by the controller to cause the controller to: (a) select a triggering event associated with the underlying game, the triggering event selected from a set of triggering events utilizing at least one random number generated by the at least one random number generator; (b) utilize the output from the at least one input device to determine if the triggering event has occurred and, if so (c) activate the bonus providing element.

In certain examples, the triggering event may be selected from a plurality of triggering events in a manner in which the certain triggering events are more likely to be selected than others. As one example, relative to an underlying roulette game, the triggering event might comprise a single roulette wheel number, two roulette wheel numbers or three roulette wheel numbers, such as where the single roulette wheel number triggering event is selected on average 60% of the time, the two roulette wheel number triggering event is selected on average 30% of the time, and the three roulette wheel number triggering event is selected on average 10% of the time.

In one aspect of the present invention, a bonus providing device distinct from underlying game play that enables a plurality of players unique benefits to an underlying game winning outcome or triggering outcome, is provided. The bonus providing device provides indications of at least three individual random indicators. At least two of the at least three individual random indicators are linear. Each one of the plurality of players is associated with a player station. The player stations are divided into a plurality of groups, with a predetermined number of player stations being associated with each of the groups. The three individual random indicators include:

a) an identification of a randomly selected one of the groups;
b) an identification of a randomly selected one of the player stations associated with the randomly selected one of the groups; and,
c) an identification of a randomly selected parameter associated with a bonus award.

In a second aspect of the present invention, a bonus providing device distinct from underlying game play that enables a plurality of players unique benefits to an underlying game winning outcome or triggering outcome, is provided. The bonus providing device provides indications of at least four individual random indicators. At least two of the at least three individual random indicators are linear.

Each one of the plurality of players is associated with a player station. The player stations are divided into a plurality of groups, with a predetermined number of player stations being associated with each of the groups. The four individual random indicators include:

a) an identification of a randomly selected one of the groups;
b) an identification of a randomly selected one of the player stations associated with the randomly selected one of the groups;
c) an identification of a randomly selected first parameter associated with a bonus award; and,
d) an identification of a randomly selected second parameter associated with the bonus award.

In a third aspect of the present invention, a computer based method associated with a bonus providing element distinct from underlying game play that enables a plurality of players unique benefits to an underlying trigger condition, is provided. The bonus providing device provides indications of at least three individual random indicators. At least two of the at least three individual random indicators are linear. Each one of the plurality of players is associated with a player station. The player stations are divided into a plurality of groups, with a predetermined number of player stations being associated with each of the groups. The three individual random indicators include an identification of a randomly selected one of the groups, an identification of a randomly selected one of the player stations associated with the randomly selected one of the groups, and an identification of a randomly selected parameter associated with a bonus award. The method includes the step of detecting an occurrence of the trigger condition and responsively randomly selecting a group of player stations from a set of available groups of player stations, randomly selecting a player station within the selected group from a set of available player stations, and providing an indication to the players of the award of the bonus player parameter using a bonus providing element.

Further objects, features, and advantages of the present disclosure over the prior art will become apparent from the detailed description of the drawings which follows, when considered with the attached figures.

BRIEF DESCRIPTION OF THE SEVERAL VIEWS OF THE DRAWINGS

These and other features and advantages of the present invention will become more readily appreciated when considered in connection with the following detailed description and appended drawings.

DETAILED DESCRIPTION OF THE INVENTION

Figure 1:
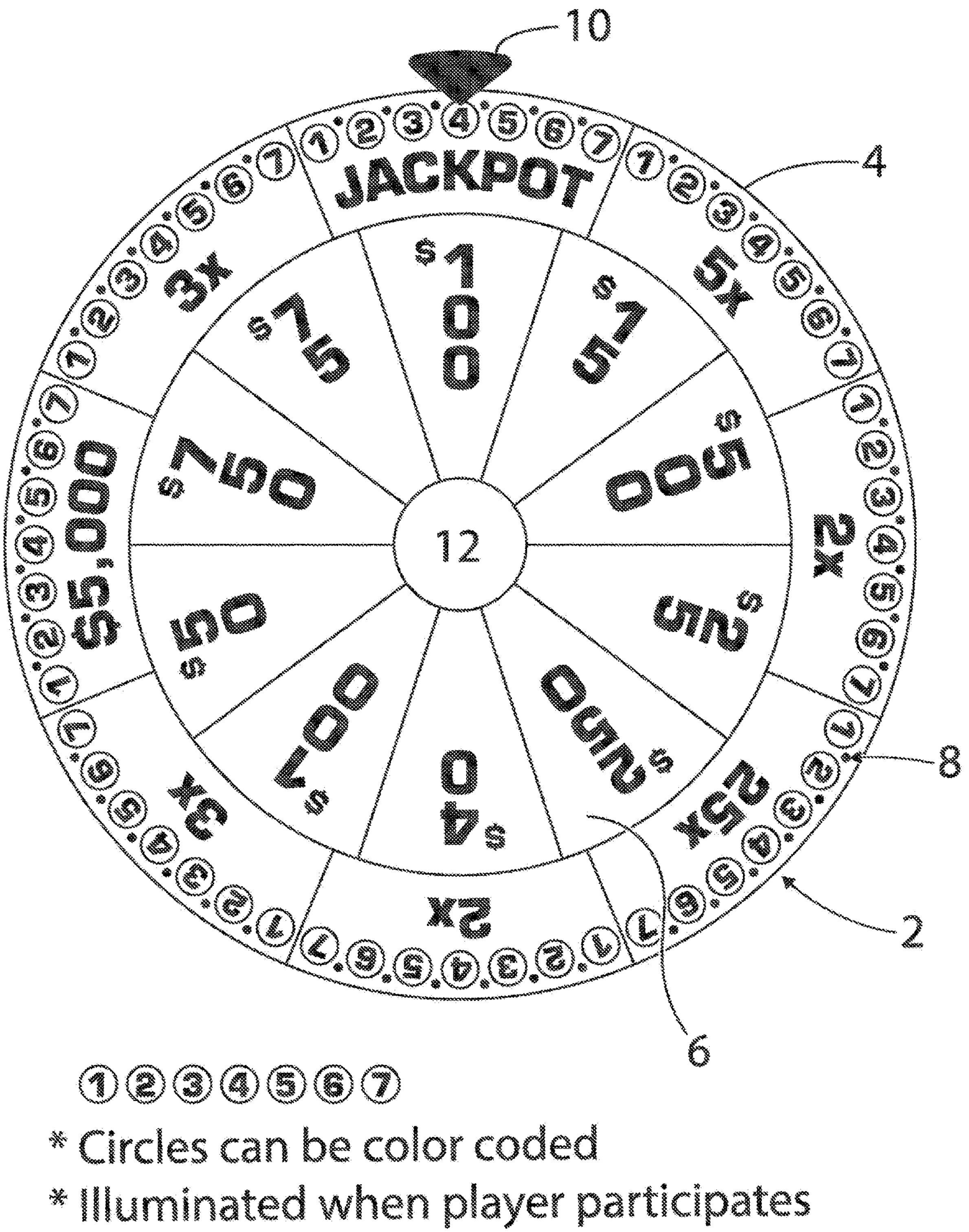
FIG. 1 shows a frontal view of a physical (or virtual) two concentric spinning wheel system.

In the following description, numerous specific details are set forth in order to provide a more thorough description of the present disclosure. It will be apparent, however, to one skilled in the art, that the present disclosure may be practiced without these specific details. In other instances, well-known features have not been described in detail so as not to obscure the disclosure.

Bonus Providing Element

With reference to the drawings, in which like elements are numbered similarly, a bonus providing element or BPE is described. One example of the disclosure is a bonus providing element (BPE) distinct from underlying game play. The BPE enables individual player unique benefits to an underlying game winning outcome. The device may be electronic (e.g., with multiple player positions around a table or arena or viewing screen) or physical and describable as including a bonus providing element distinct from underlying game play that enables individual players or groups of players unique benefits to the underlying game winning outcome or triggering outcome.

In certain examples, the bonus providing element provides a linear indication of at least three individual random indicators, wherein the at least three individual random indicators may comprise:

a) an identification of a single one of at least two different player positions;

b) at least one of an absolute amount or multiplier of a winning outcome payout; and c) at least one of a multiplier, prize or an absolute amount larger than or smaller than any absolute amount or multiplier in b).

In a stadium or venue example, the bonus providing element may provide indications of at least three individual random indicators, wherein at least two of the at least three individual random indicators are linear. As discussed in further detail below, each one of the plurality of players is associated with a player location. The player locations are divided into a plurality of player station groups with a predetermined number of player locations being associated with one of the player location segments. In one embodiment, each player location group is a row of player locations. In another embodiment, each player station group is a section having a plurality of rows of player locations. The three individual random indicators may be an identification of one of the player sections, an identification of one of the play locations associated with the one of the player sections, and a parameter associated with a bonus award.

In certain examples, when a winning outcome or triggering outcome by a first player position (any player position in a group of players) occurs in an underlying game, the bonus providing element is subsequently activated to randomly provide random outcomes for each of the at least three individual random indicators, and the random outcomes for the three individual random indicators is applied as i) one random outcome for the first player position, and ii) a combination of two remaining random outcomes indicates an award to at least one player position different from the first player position.

In the bonus providing element, linear indication may be provided by at least three distinct and randomly rotating concentric elements with a first rotating concentric element defining a sector of a first concentric circular wheel indicating one of a), b) and c), and a second rotating concentric element defining a sector of a second rotating concentric wheel one of a), b) and c) without repeating any one of a), b) and c), and a third rotating concentric element defining a sector of a third rotating concentric wheel one of a), b) and c) without repeating any one of a), b) and c).

The bonus providing element may have linear indication provided by at least two distinct and randomly rotating concentric elements with an inner element defining a sector of a circular wheel indicating one or two of a), b) and c), and at least one outer element defining a truncated sector at least one of a), b) and c) without repeating any one of a), b) and c) defined by inner element, with a total of exactly three of a), b) and c) provided by the inner element and the at least one outer element.

The bonus providing element may have linear indication provided by three distinct and randomly rotating concentric elements with an inner element defining a sector of a circular wheel indicating one of a), b) and c), and a first outer element defining a truncated sector with one of a), b) and c) without repeating any of a), b) and c) defined by the inner element; and a second outer element defining a truncated sector with one of a), b) and c) without repeating any of a), b) and c) defined by the inner element and the first outer element with a total of exactly three of a), b) and c) provided by the inner element, the first outer element and the second outer element.

The bonus providing elements may have the inner element provide exactly one of a), b) and c), and the outer element provide remaining ones of a), b) and c) not provided for in the inner element, or the outer element provide exactly one of a), b) and c), and the inner element provide remaining ones of a), b) and c) not provided for in the inner element.

The bonus providing element may have the bonus providing element providing a linear indication of at least three individual random indicators comprising three rows of at least six columns, all random outcomes for a), b) and c) distributed with all combinations of one of a), b) and c) distributed within respective ones of a top row, middle row and bottom row, and the linear indication comprising a single column.

The bonus providing element may alternatively have the bonus providing element is providing a linear indication of at least three individual random indicators comprising six rows of at least three columns, all random outcomes for a), b) and c) distributed with all combinations of one of a), b) and c) distributed within respective ones of a left column, middle column and right column, and the linear indication comprising a single row.

The bonus providing elements may be provided by physical elements including a rotating inner sector and rotating outer truncated sectors, or by virtual elements comprising a rotating inner sector and rotating outer truncated sectors provided on a video display in communication with a processor, memory and a random number generator, the random number generator providing random ones of a), b) and c) for display on the video display.

The bonus providing element in a virtual display may have random outcomes provided by virtually horizontally shifting columns on the video display or provided by virtually vertically shifting columns on the video display.

The bonus providing elements may be associated with a single a casino table configured for use with a physical playing card game, dice game, or wheel game (e.g., roulette or Big Six), multiple linked tables, an arena set up of multiple player positions, a multiplayer platform with individual players sharing a common screen or dealer and the like. The bonus providing element may be associated with a single casino table configured for use with a physical playing card game, dice game, or wheel game. The virtual or physical playing card game, dice game, or wheel game may be selected from the group consisting of blackjack, baccarat, poker, craps, sic bo, and roulette.

The wheel system is a progressive/side bet bonus system for table games. In certain examples, all players must place a separate wager before the table game begins is to participate. As described in more detail below, the bonus providing element may be activated by one or more triggers, such as a specific event that occurs during the underlying game (such as a community event, including Boxcars in craps, a 0 or 00 in roulette, trips in Sic Bo, a dealer 3 card seven in Baccarat). The wheel system contains 3 randomly generated events. In one version, the first event is a community prize that all participating players win. The second event is a player position at the table. The third event is an enhanced prize (either a multiplier of the community prize, a fixed dollar amount, a physical prize (car), or a progressive jackpot) which the player position selected in the second event wins. The selected player position must be participating in the bonus wager to receive the prize. The system may reveal the three randomly generated events in any order. In another example, the trigger is an event unique to at least one participating player (e.g. A dealt blackjack in Blackjack, a flush in Pai Gow). The wheel system contains 3 randomly generated events. The first event is a prize that the at least one participating player with the triggered event wins. The second event is a player position at the table. The third event is an Envy prize which the player position selected in the second event wins (the third event may be a percentage of the prize selected in the first event, or an absolute amount). The selected player position must be participating in the bonus wager to receive the prize. The system may reveal the three randomly generated events in any order.

The Wheel Bonus System is for all formats and all table games—Live, ETG, Virtual, Online, Mobile.

A common problem with community games is that all combinations of cards, dice and roulette results that trigger a progressive jackpot do so for all of the participating players, and the players have to share the progressive.

A method for providing bonus events to an underlying gaming event including multiple players at identified player positions may be performed by:

1) at least one player placing a wager in the underlying gaming event;
2) executing an event to conclusion of an outcome of the underlying gaming event; identifying the outcome as a predefined triggering outcome;
3) after identifying the outcome as the predefined triggering outcome, activating a bonus providing element distinct from underlying game play to enable individual players or groups of players unique benefits in the underlying game triggering outcome, the bonus providing element providing a linear indication of at least three individual random indicators, the three individual random indicators including:

a) an identification of a single one of at least two different player positions;
b) outcomes of at least one of an absolute amount or multiplier of a winning outcome payout; and
c) outcomes of at least one of a multiplier, prize or an absolute amount larger than or smaller than any absolute amount or multiplier in b); wherein, in combination with the triggering outcome by a first player position in the underlying game, the bonus providing element randomly provides random outcomes for each of the three individual random indicators, and the random outcomes for the three individual random indicators is applied as i) one random outcome for at least the first player position, and ii) a combination of two remaining random outcomes indicates an award to at least one player position that may be different from the first player position.

The method may have the bonus events available to only players wagering a predetermined minimum amount on the underlying game or available to only players wagering a side bet or progressive wager.

In certain examples of the method, a single one of at least five different player positions may be awarded only one of a), b) or c), and at least one of at least four remaining player positions in the underlying game are awarded a fixed award different from the only one of a), b) and c) awarded to the single one of the at least five player positions.

The underlying game may be a playing wagering event executed on a physical gaming table, and the bonus providing event comprises a separate physical random 25 event generator or electronic random generator comprising the three individual random indicators. The method may be executed wherein b) and c) are each unequally weighted among frequencies of b) and c) outcomes and a) is equally weighted among individual different player position frequencies.

The three randomly generated events can be displayed in several different formats.

Figure 2:
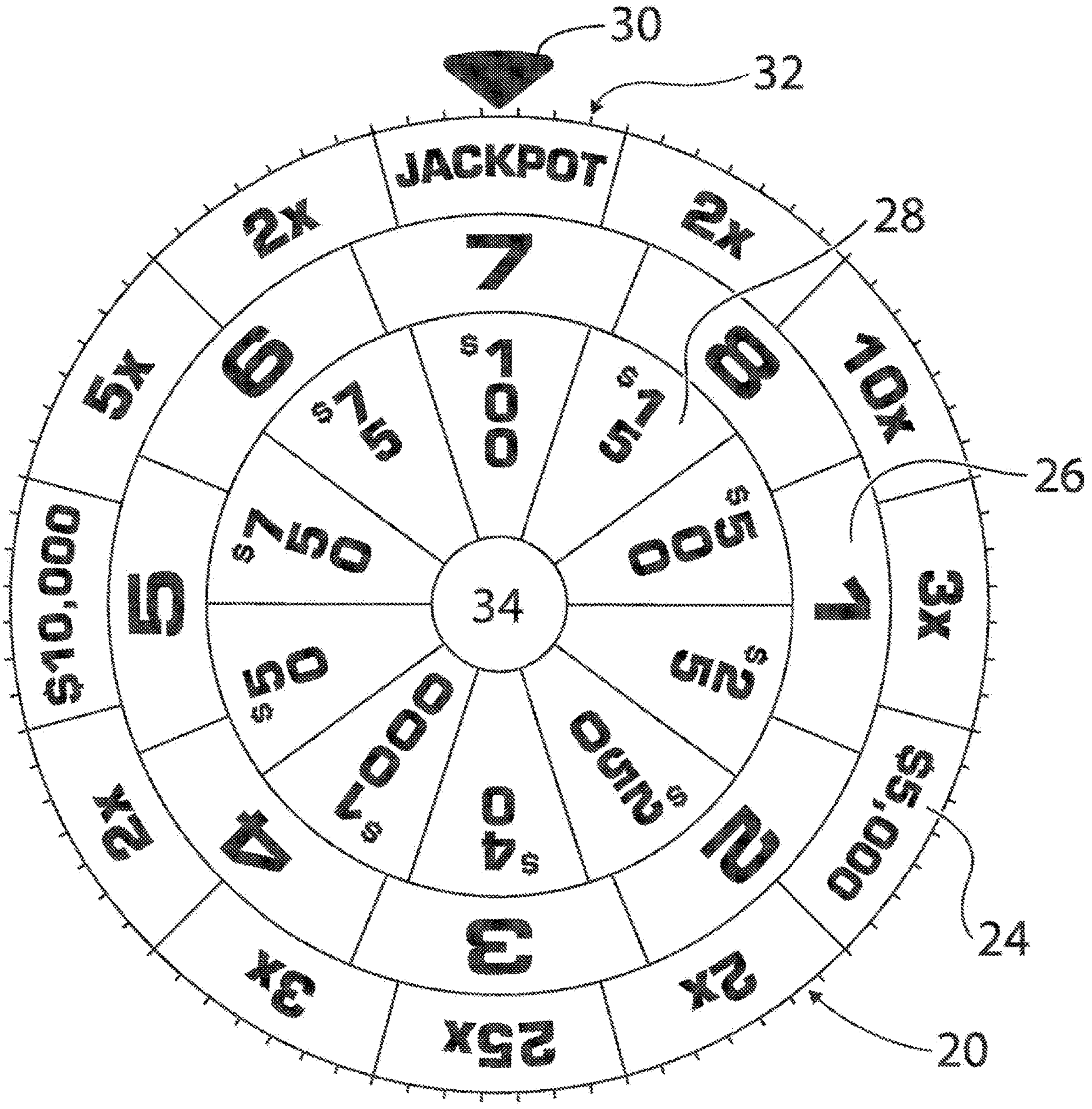
FIG. 2 shows a frontal view of a first physical (or virtual) three concentric spinning wheel system.
Figure 3:
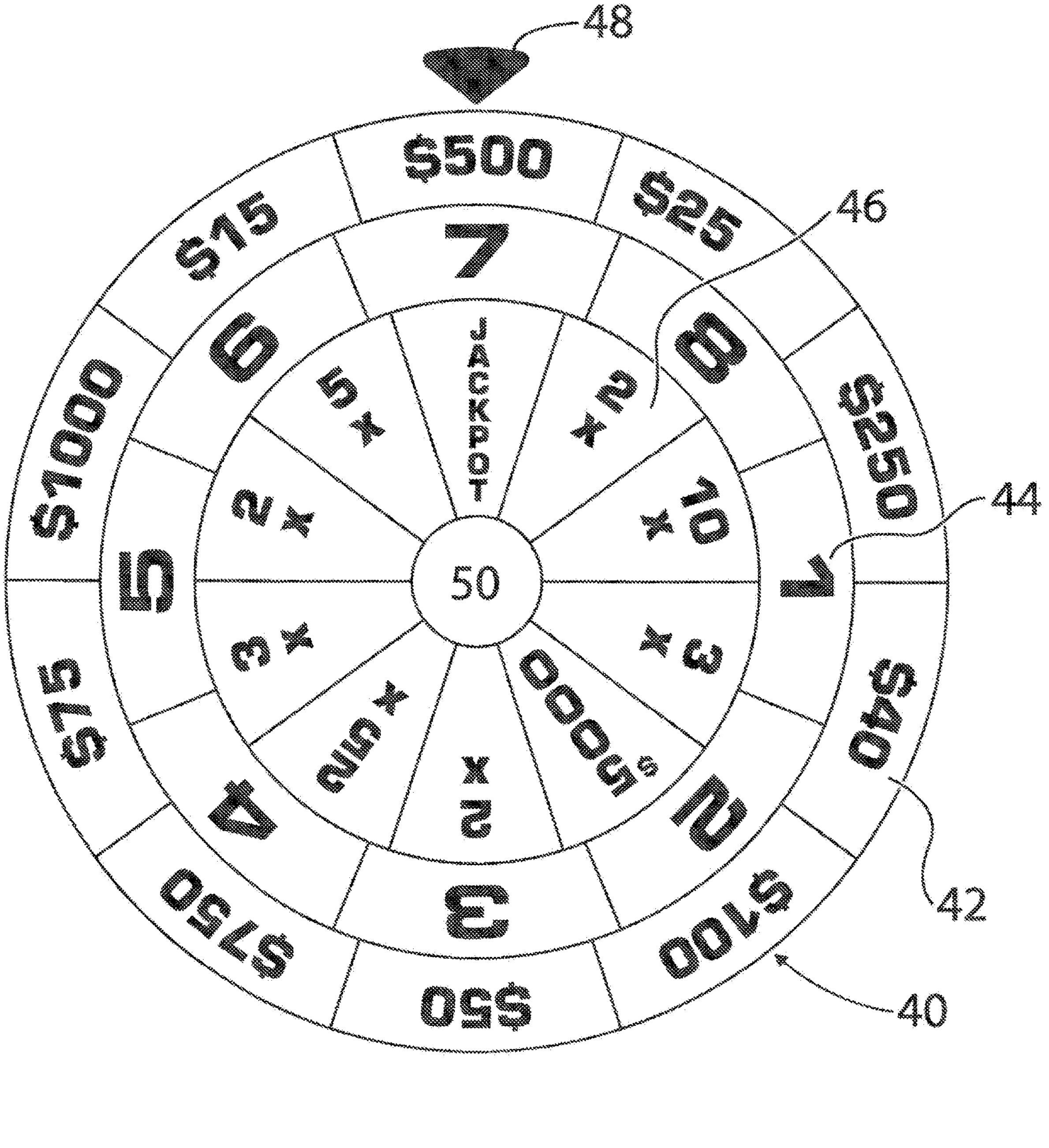
FIG. 3 shows a frontal view of a second physical (or virtual) three concentric spinning wheel system.

One example uses a wheel with three rings (FIGS. 2 and 3). One ring of the wheel determines the community prize won or an individual player position won. A second ring determines a player position. This second ring can have a number of sections which equals the number of player positions at the table OR can have a number of sections which equals the number of participating players at the table.

A third ring determines what the enhanced prize is (either a multiplier of the community prize, a fixed dollar amount, a physical prize (car), or a progressive jackpot). The wheel may display the three rings in any order (SEE FIG. 3).

Another example uses a wheel with two rings. One ring of the wheel determines the community prize won. The second ring determines a player position AND an enhanced prize (either a multiplier of the community prize, a fixed dollar amount, a physical prize (car), or a progressive jackpot). This second ring can be displayed in two ways. The second ring can have a number of sections which display the enhanced prizes. Each of these sections can be divided into different sectors to determine which player position wins the enhanced prize (FIG. 1). The size of the sections can be proportionate to the likelihood of winning the enhanced prize (Example . . . a sector for a 2 x. multiplier can be larger than the jackpot sector, indicating it is more likely under the secondary RNG). However the section sizes can also be the same size, with some sections being more likely than others. In another example the second ring can have a number of sections which display the player positions. Each of these sections can be divided into different sectors to determine the enhanced prize.

Another example uses 3 individual wheels—each wheel displaying one of the three randomly generated events.

FIG. 1 shows a frontal view of a physical (or virtual) two concentric spinning wheel system 2. The system 2 is shown with an outer truncated sector 4 having both divider pegs 8 which separate each of the numbers player position identifiers (here, 1, 2, 3, 4, 5, 6, and 7 players are identified). Here a physical (or virtual) pointer identifies a random selection of Player 4 on the outer wheel 4 and the absolute value award of $100 in the center sector of inner wheel 6. There is a virtual or physical center axis 12 shown, with the regions 4 and 6 revolving around that center axis 12.

FIG. 2 shows a frontal view of a first physical (or virtual) three concentric spinning wheel system 20. An outermost first truncated sector wheel 24 is shown is (this is "truncated" as the innermost portion of the sector is cut away or covered by inner wheel elements 26 and 28) with multipliers and absolute award amounts (including a "Jackpot") that are higher than any absolute award amounts in the inner sector element 28, which is in turn within the second truncated sector area 26 which randomly identifies player positions (here randomly selected from among 1, 2, 3, 4, 5, 6, 7 and 8 player positions). A virtual or physical pointer 30 stops relative to virtual or physical pegs 32 to identify the three linear random bonus selector outcomes in the three areas 24, 26 and 28). The three linear random bonus selector outcomes in the three areas 24, 26 and 28 are concentric to a physical or virtual center axis 34.

FIG. 3 shows a frontal view of a second physical (or virtual) three concentric spinning wheel system 40. Again, a virtual or physical pointer 48 and center axis 50 are shown. The three areas of outer truncated sector 42, inner truncated sector 44 and inner sector 46 are shown indicating their respective individual ones of the three random elements that combine to implement the bonus. For example, when there is a suited blackjack, two naturals in baccarat, or at least a flush in a stud poker table game, the spinning wheel system 40 may be activated, and the award given (for example) whether or not the identified player position is the position triggering the event (all positions in baccarat trigger the event as there is a common players' hand) to that identified player position.

Figure 4:
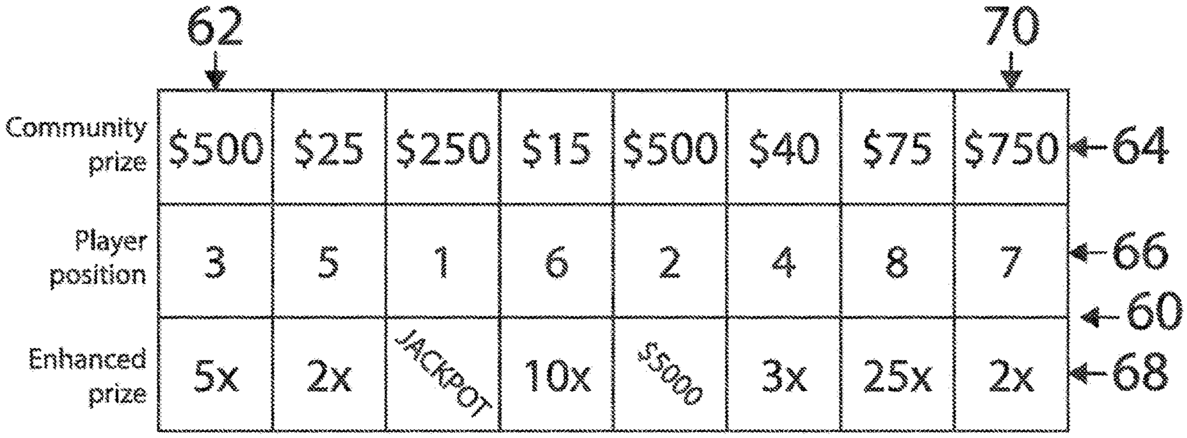
FIG. 4 shows a frontal view of a first physical (or virtual) three row, six column random event outcome system.

FIG. 4 shows a frontal view of a first physical (or virtual) three row 64, 66, 68, six column 70 random event outcome system 60. A virtual or physical pointer 62 identifies the three random indicators to be combined. The rows 64, 66, 68 would shift back and forth to create randomness, either physically or virtually.

Figure 5:
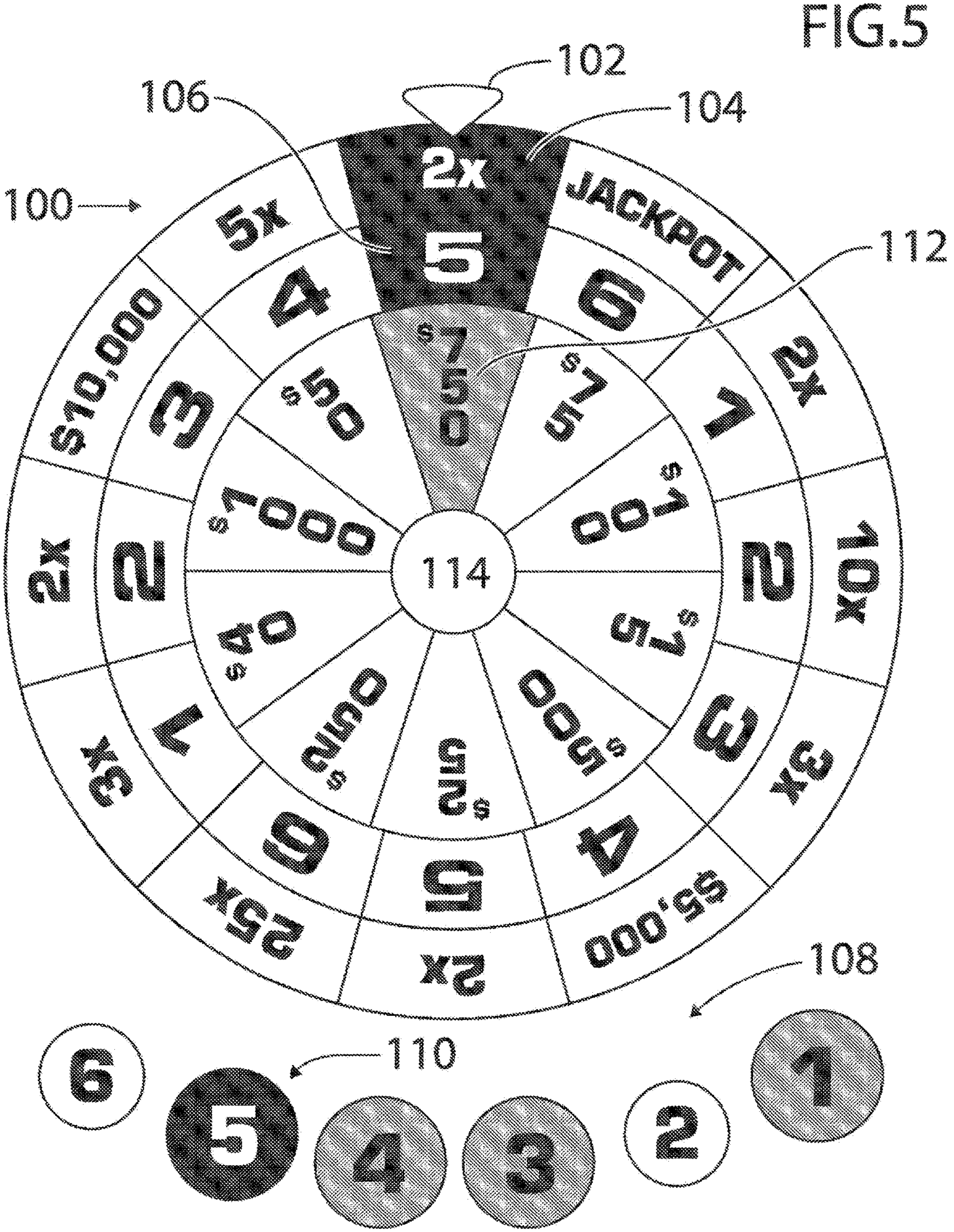
FIG. 5 shows a frontal view of a first physical (or virtual) three concentric wheel, six player column random event outcome system.

FIG. 5 shows a frontal view of a first physical (or virtual) three concentric wheel device 100, six player column random event outcome system. A pointer 102 is shown conveniently located at a top position with respect to the wheel device 100. The pointer 102 is pointing down three aligned segments 104 (showing a 2 x. award), a second segment 106 indicating a player position (from among 1, 2, 3, 4, 5, and 6 shown on the concentric wheel device 100) that is awarded the 2 x. random award of the first segment 104. The third center segment 112 (the order of the random effects is optional) indicates an award of $750 for all participating players that had the winning outcome or the triggering event for the bonus activity provided by the three concentric wheel device 100. A central spindle area 114 is shown, as well as a separate display area 108 in which the player position (110 No. 5) selected by the second segment 106 is highlighted.

Figure 6:
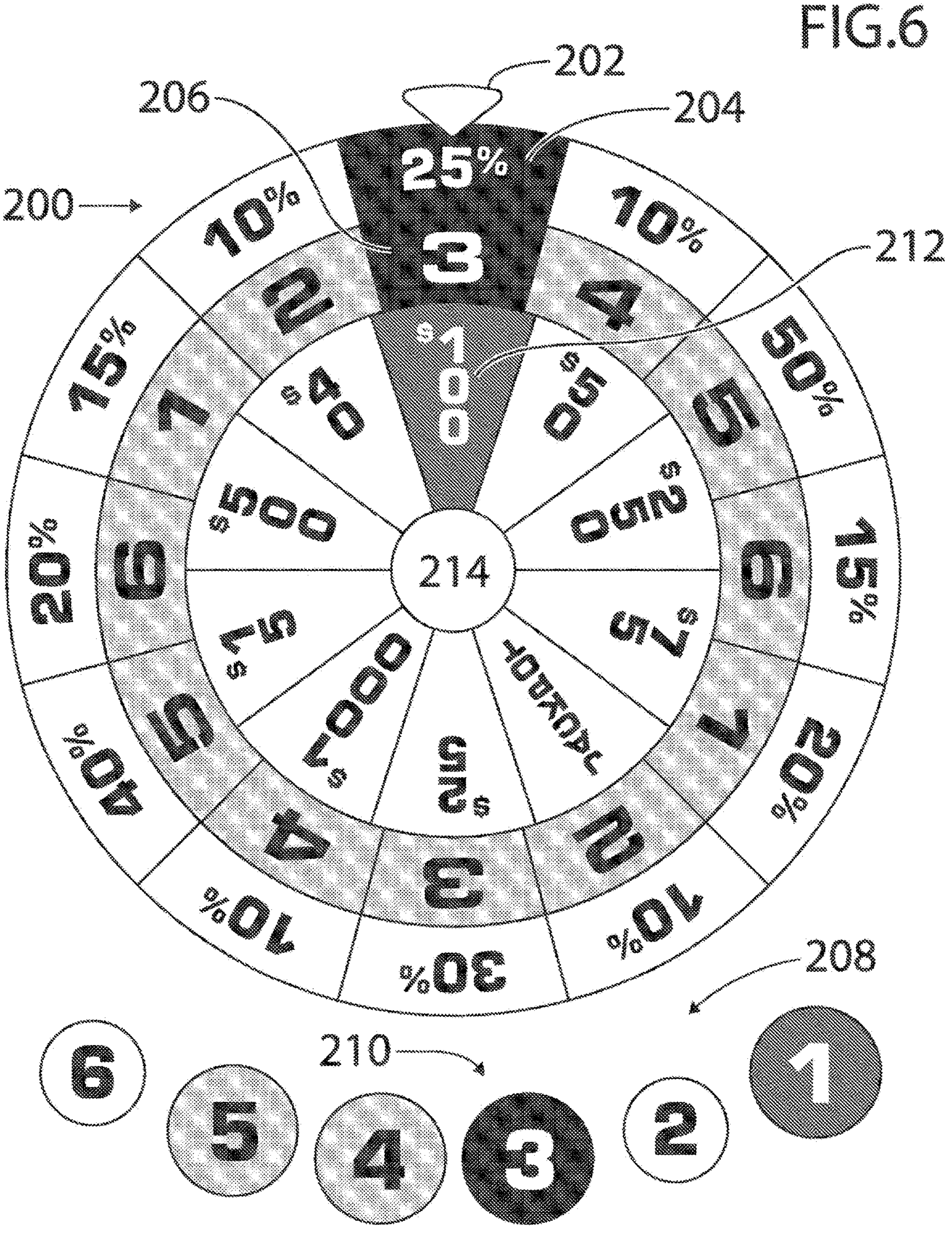
FIG. 6 shows a frontal view of a second physical (or virtual) three concentric wheel, six player column random event outcome system.

FIG. 6 shows a frontal view of a second physical (or virtual) three concentric wheel 200, six player column random event outcome system. A pointer 202 is shown conveniently located at a top position with respect to the wheel device 200. The pointer 202 is pointing down three aligned segments 204 (showing a 25% award multiplied against any objective, such as the minimum wager, the amount won by a player triggering the bonus event, or a multiple of the minimum wager, etc.), a second segment 206 indicating a player position (from among 1, 2, 3, 4, 5, and 6 shown on the concentric wheel device 200) that is awarded the 25% random award of the first segment 204. The third center segment 212 (the order of the random effects is optional) indicates an award of $100 for a player that had the winning outcome or the triggering event for the bonus activity provided by the three concentric wheel device 200. A central spindle area 214 is shown, as well as a separate display area 208 in which the player position (210 No. 3) selected by the second segment 206 is highlighted.

Event Triggering and BPE Activation

As indicated above, In certain examples, a bonus providing element (BPE) is activated at certain times. The activation of the BPE may occur when a predetermined triggering event occurs. The triggering event may comprise, for example, a particular event associated with the play of the underlying game.

One aspect of the disclosure is a method and system for activating a BPE, such as (but not limited to) the BPE described and illustrated herein, including selecting triggering events therefor.

Figure 7:
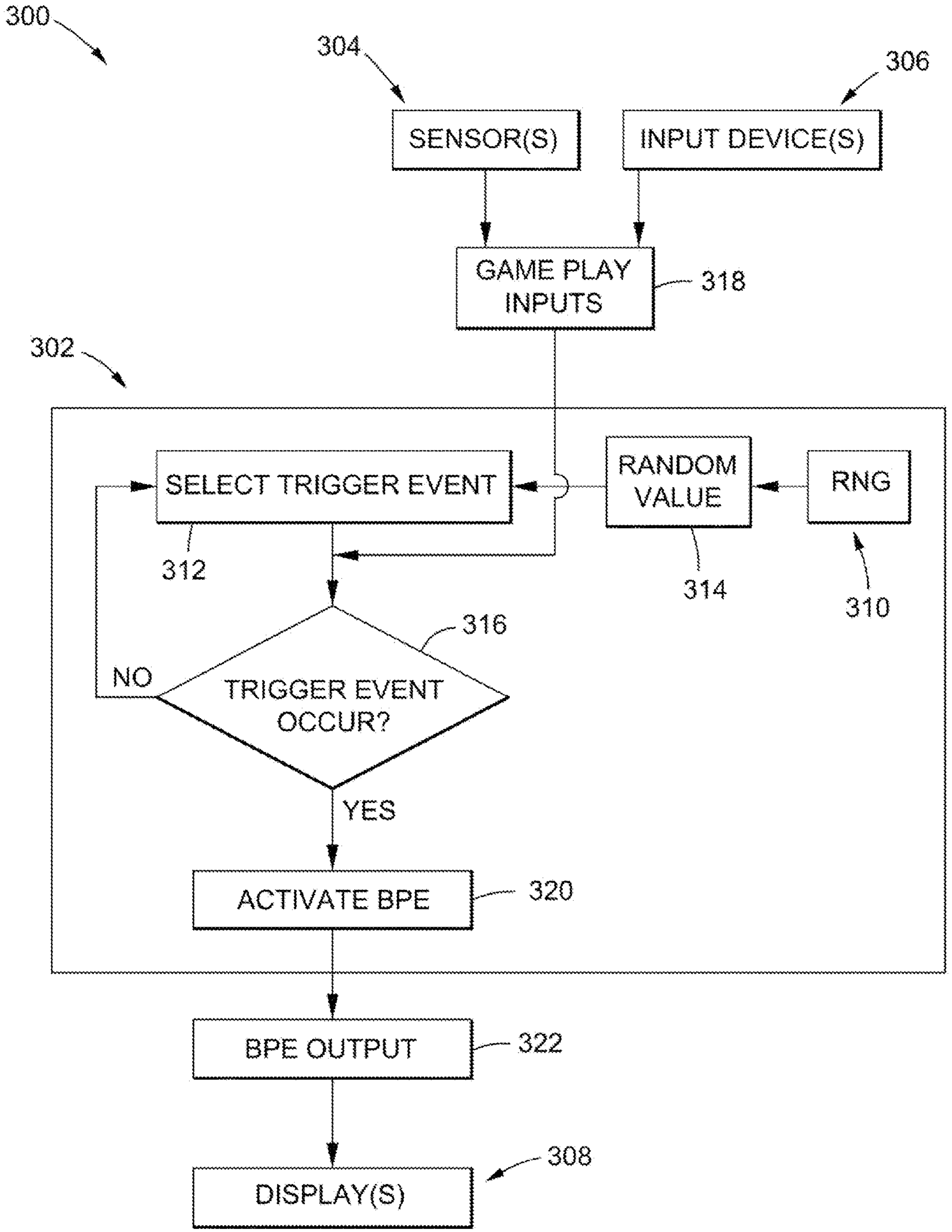
FIG. 7 schematically illustrates aspects of a system in accordance with an example of the disclosure.

FIG. 7 illustrates a system 300 for implementing a BPE, including activating the BPE. As illustrated, the system 300 comprises a controller 302. The controller 302 may comprise, for example, a processor which is configured to execute machine-readable code (e.g. "software"), which code may be stored in a memory (not shown) which is associated with the processor. The controller 302 might comprise, for example, a table controller which is located at or associated with a gaming table at which a wagering game is being presented, or might comprise a controller associated with a gaming system server or the like.

The controller 302 is preferably in communication with one or more input devices. Such input devices might comprise sensors 304 and/or other input devices 306. The sensors 304 might comprise, for example, one or more cameras, IR sensors, RFID readers or various other sensors, such as associated with a gaming table or elements thereof (such as a card shuffler, card shoe, roulette wheel, etc.). The input devices 306 might comprise devices which are configured to receive input from a user, such as a button, touch-screen, mouse, keyboard, etc., or might comprise a device which generates an output, such as a card shuffler, card shoe, etc.

The controller 302 is preferably in communication with one or more displays 308. The display(s) 308 may comprise, for example, a video display. The display 308 might also comprise a physical wheel or reel or other device.

In certain examples, the controller 302 implements, such as via the machine-readable code, a random number generator (RNG), such as which generates random numbers or values, or other types of random selectors.

Additional details of the system 300 will be appreciated from a description of a method of use thereof.

In certain examples, at one or more times, the controller 302 is configured to select one or more triggering events 312. The one or more triggering events may be selected using a random value (such as at least one random number) 314 which is generated by the RNG 310. As one example, a look-up table of triggering events may be provided, wherein the random value 314 is used to select one of the events from the table. In certain examples, the event table may include a plurality of triggering events, such as identified by a position or other identifier, and the random value may be correlated to one of the positions or identifiers, thus result in the selection of the triggering event associated with that position or other identifier.

As described below, the triggering event is preferably selected from a set of triggering events (e.g. at least two events). In certain examples, the probability of selecting at least one triggering event may be different than the probability of selecting another triggering event (so that the frequencies of certain triggering events being selected may vary from one another). Further, the triggering event may have more than one component, such as a first component which identifies a first aspect of the triggering event (such as a number of roulette wheel numbers than will comprise triggers) and a second component which identifies a second aspect of the triggering event (such as the individual roulette wheel numbers that comprise each of the triggers).

The controller 302 then determines if a triggering event has occurred 316. This determination is made by comparing game play input information 318 to the one or more selected trigger events. The game play inputs 318 may depend upon the particular game and might comprise, for example, one or more cards, one or more hands, an outcome of a roulette wheel spin or other event associated with the play of the underlying game. As indicated, such information may be provided by the one or more input device, such as the sensors 304 or other input devices 306.

As one example, a triggering event might comprise the outcome of a roulette wheel spin as the roulette wheel number "Red 23." The outcome of the roulette wheel spin may be provided to the controller 302 via a sensor, such as a sensor associated with the roulette wheel, or might be provided by the croupier (such as by input to a touch-screen display), for comparison to the triggering event.

If the triggering event does not occur, then the BPE is not activated (e.g. in the above example, such as if the outcome of the roulette wheel spin was the selection of a roulette wheel number other than Red 23). However, if the selected triggering event did occur, then the controller 302 may be configured to activate the BPE. This may comprise the controller 302 generating an output 322, such as information to be displayed by the one or more displays 308, an output signal which causes a physical wheel to be rotated (such as with a motor, etc.). Of course, the controller 302 might activate the BPE in conjunction with other inputs or signals. For example, In certain examples, a player or dealer might be permitted to provide an input which implements the BPE. As one example, the controller 302 might activate the BPE and then display a "touch to spin" button on the display 308. A player or the dealer might then provide a spin input, such as via a spin button. Upon receiving that input, the controller 302 might generate the BPE output or send that output to the display(s) 308 so as to cause them to display the BPE event.

One example of the disclosure comprises a method and system for activating a BPE associated with a roulette game. In certain examples of the disclosure, the triggering event for a particular roulette game may comprise different numbers of triggers, such as one (1) roulette number, two (2) roulette numbers, or three (3) roulette numbers. Most preferably, the frequencies of those triggering events differs, such as by having the 1-number trigger be selected more frequently than the 2-number trigger, which is selected more frequently than the 3-number trigger. As one example, the 1-number trigger might be configured to be selected approximately or on average 60% of the time, the 2-number trigger 30% of the time, and the 3-number trigger 10% of the time (e.g. whereby one or more of the triggering events has a higher probability of being selected than one or more other triggering events). This could be implemented in various manners, such as by a look-up table with slots 1-10, where the 1-number trigger is associated with positions 1-6, the 2-number trigger with slots 7-9, and the 3-number trigger with slot 10, such as shown in Table 1 below:

TABLE 1

| Position | Triggers |
|---|---|
| 1 | 1 number |
| 2 | 1 number |
| 3 | 1 number |
| 4 | 1 number |
| 5 | 1 number |
| 6 | 1 number |
| 7 | 2 numbers |
| 8 | 2 numbers |
| 9 | 2 numbers |
| 10 | 3 numbers |

The RNG output may then be compared to the table. For example, the RNG output might comprise the numbers 1-10, such that the random selection of the number "6" would result in the selection of position 7 in the table, and thus a 2-number triggering event. Given that two times as many "1-number triggers" are associated with the table than "2-number triggers", it would be expected that a 1-number trigger would be selected approximately twice as often as a 2-number trigger.

Once the type of triggering event (in this case the number of triggers) has been selected in this manner, the one or more individual roulette numbers which comprise the triggers might then be separately selected (in other examples, the particular roulette wheel numbers for each might be fixed), such as again via the RNG, such as by using one or more additional or second random numbers. As one example, assuming that the roulette wheel being used is a "00" wheel, a table might be provided with spaces 1-38, wherein positions 1-36 correspond to the numbers 1-36, position 37 corresponds to the number 0 and position 38 corresponds to the number 00, such as illustrated in Table 2 below:

TABLE 2

| Position | Roulette Wheel Number |
|---|---|
| 1 | 1 |
| 2 | 2 |
| etc . . . | etc . . . |
| 36 | 36 |
| 37 | 0 |
| 38 | 00 |

If the RNG outcome was 38, then the roulette wheel number selected would be 00. In this configuration, a first output of the RNG may be used to select the required number of roulette wheel numbers or positions (e.g. the number of triggers) and additional RNG outputs may be used to select the individual triggers, e.g. the specific roulette wheel number or numbers For example, if a 1-number trigger was selected, then one roulette wheel number is selected using the RNG, such as 00. If a 2-number trigger had been selected, then two roulette wheel numbers are selected using the RNG, such as the numbers 00 and 6.

Of course, the controller 302 may be configured to generate or select the triggering events in other manners. For example, a complex look-up table might be generated which has positions corresponding to 1, 2 and 3 number triggering events, wherein each position also designates the particular roulette wheel numbers (e.g., Position 1: 4; Position 2: 23,35; Position 3: 10, 17 and 31), where the number of positions that correspond to each type of triggering event might vary (for example, 60% of the positions may be 1-number positions, etc.).

In certain examples, once the roulette game triggering event has been selected by the controller 302, it may be displayed or otherwise indicated to the players and dealer, such as via display on the display 308. In certain examples, a roulette game triggering event it selected for each roulette game (whereby the triggering event for each game is variable).

Another example of the disclosure comprises a method and system for activating a BPE associated with a craps game. In certain examples, the selection of the triggering event may comprise the selection the combined point total of the roll of two dice (e.g. a dice roll count), such as any number between 2 and 12. In certain examples, however, the triggering event comprises only a sub-set of those numbers which comprise craps "points" or point values, e.g. dice roll count totals of 4/5/6 and 8/9/10. In certain examples, the triggering event comprises a single one of these points, but might comprise more than one (in similar manner to the roulette triggering event described above, such as any 1 point, any 2 of the points, etc.). Further, in certain examples, the frequency of the selection of each point may be the same, but in other examples, it might vary.

In certain examples, the triggering event for a craps game may be selected at various times, such as before the come out roll for the game. Once again, the triggering event for the craps game may be indicated, such as by the display, to the players.

Of course, the principles of the disclosure may be applied to other underlying games.

Stadium or Arena Bonus Providing Element

With reference to FIGS. 9-20C, in another aspect of the present invention, a stadium bonus providing device 600 for use in a stadium or arena environment 500 may be provided. In an arena or stadium environment 500, a large number of player stations 502 may be located in one location. One or more games may be provided to the players (from a central location) to the player stations 502. The players may be playing the same instance of the same game, multiple instances of the same game, or one or more instances of different games. The games may be generated electronically or via live dealers. As discussed in more detail below, the player stations 502 may be arranged into player station groups 506 which may be sections 510 and/or rows 508.

Several non-limiting stadium or arenas having a large number of player stations 502 are shown in FIGS. 8-11.

Figure 8:
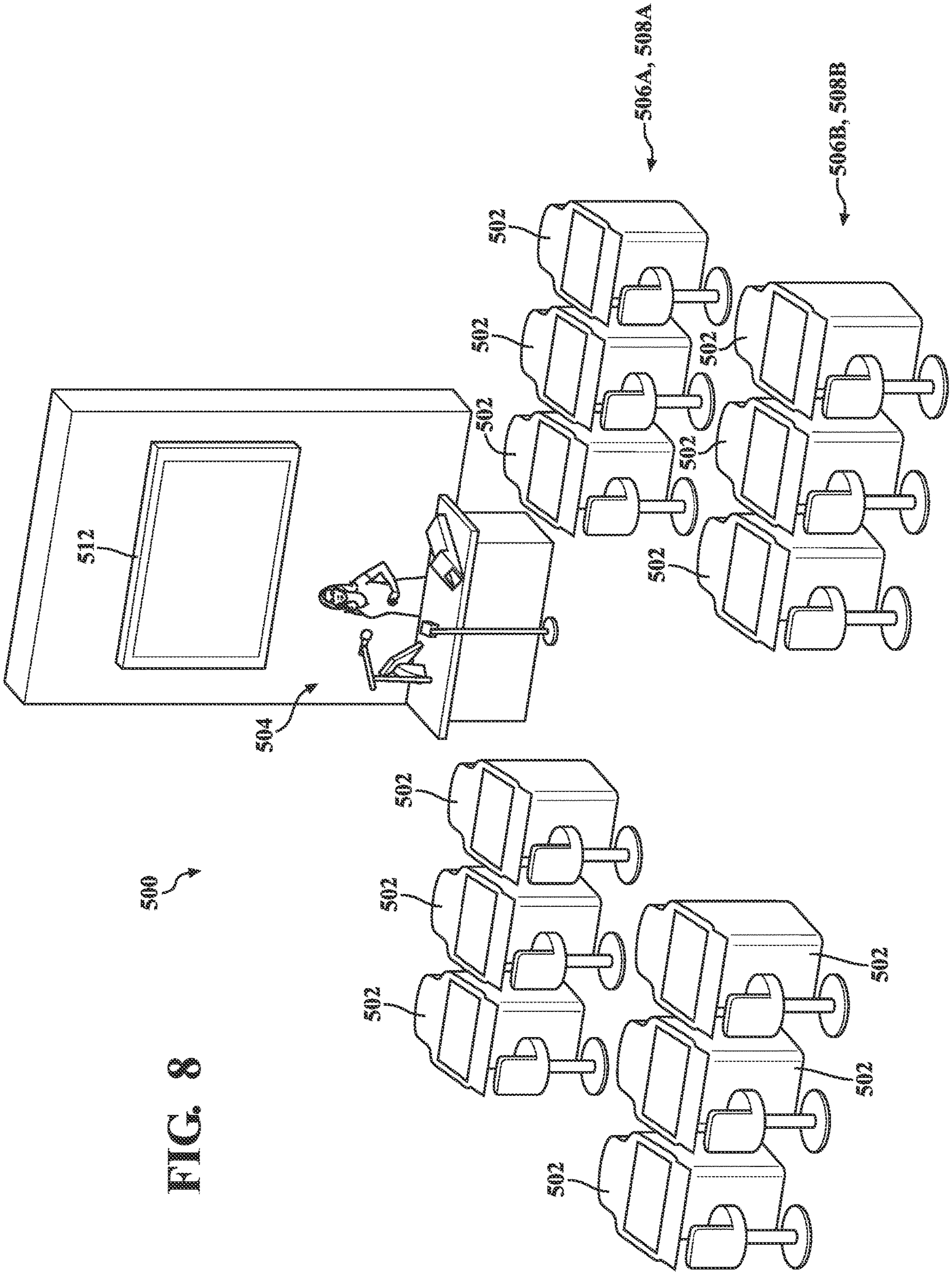
FIG. 8 is a graphic representation of a venue or stadium at which a game or games may be provided with which a bonus game system according to the present invention may be used.

In the stadium environment 500 of FIG. 8, twelve player stations 502 are shown. The twelve player stations 502 are grouped into two player location groups 506A, 506B which are shown as rows 508A, 508B. Each row 508 includes six player stations 502. As discussed above, the bonus providing element 600 may be a physical or virtual device. The bonus providing device 600 may be presented or arranged in a position in front of the player stations 502 such that it is viewable by the players at the player stations 502. For virtual implementations, the bonus providing element 600 may displayed on a central display 512 or individual displays at each player station 502.

Figure 9:
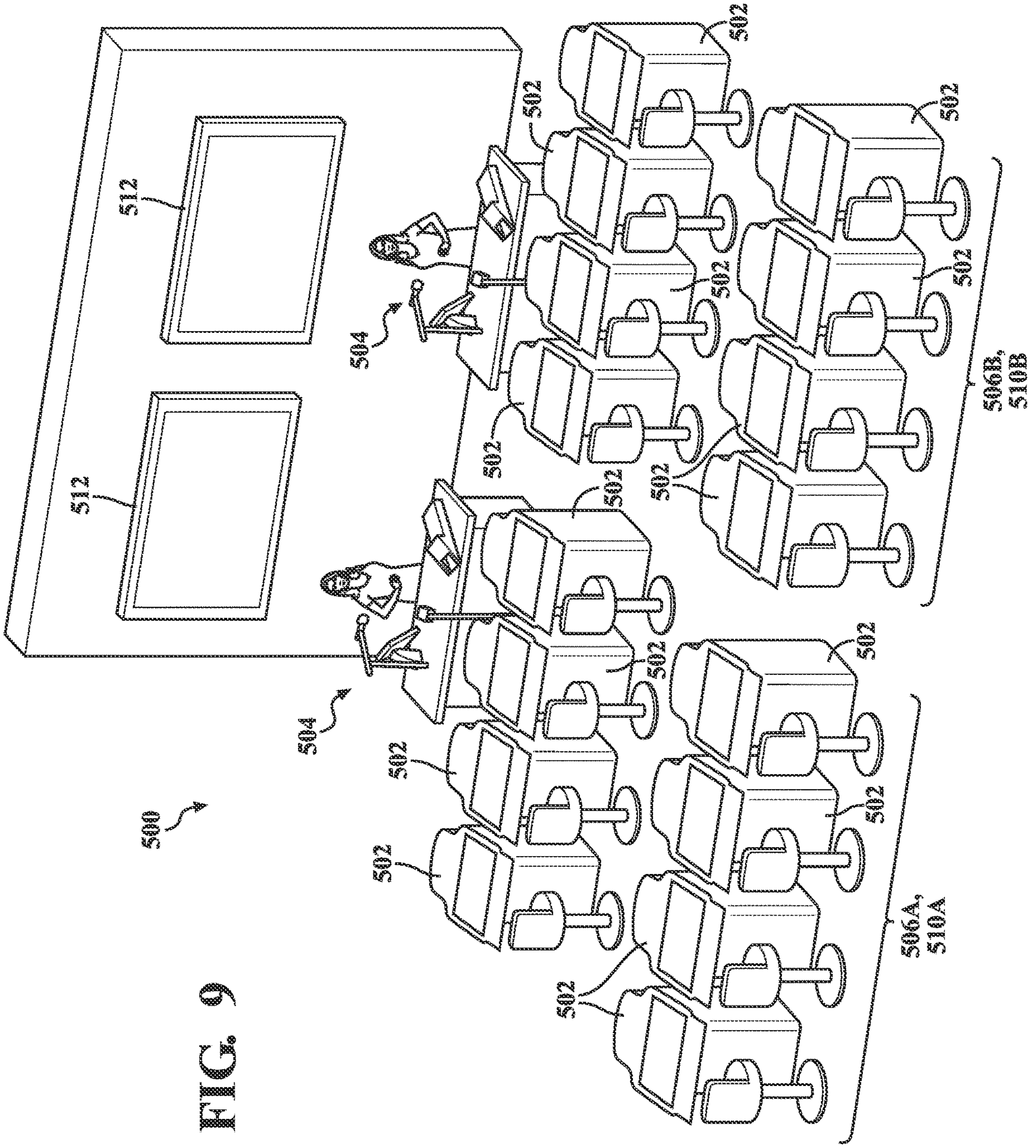
FIG. 9 is a graphic representation of a second venue or stadium at which a game or games may be provided with which a bonus game system according to the present invention may be used.

In the stadium environment 500 of FIG. 9, sixteen player stations 502 are shown. The sixteen player stations are grouped into two player location groups 506A, 506B which are shown as sections 510A, 510B each including eight player stations 502. In the illustrated embodiment, the stadium environment 500 includes two dealers 504 and two central displays 512.

Figure 10:
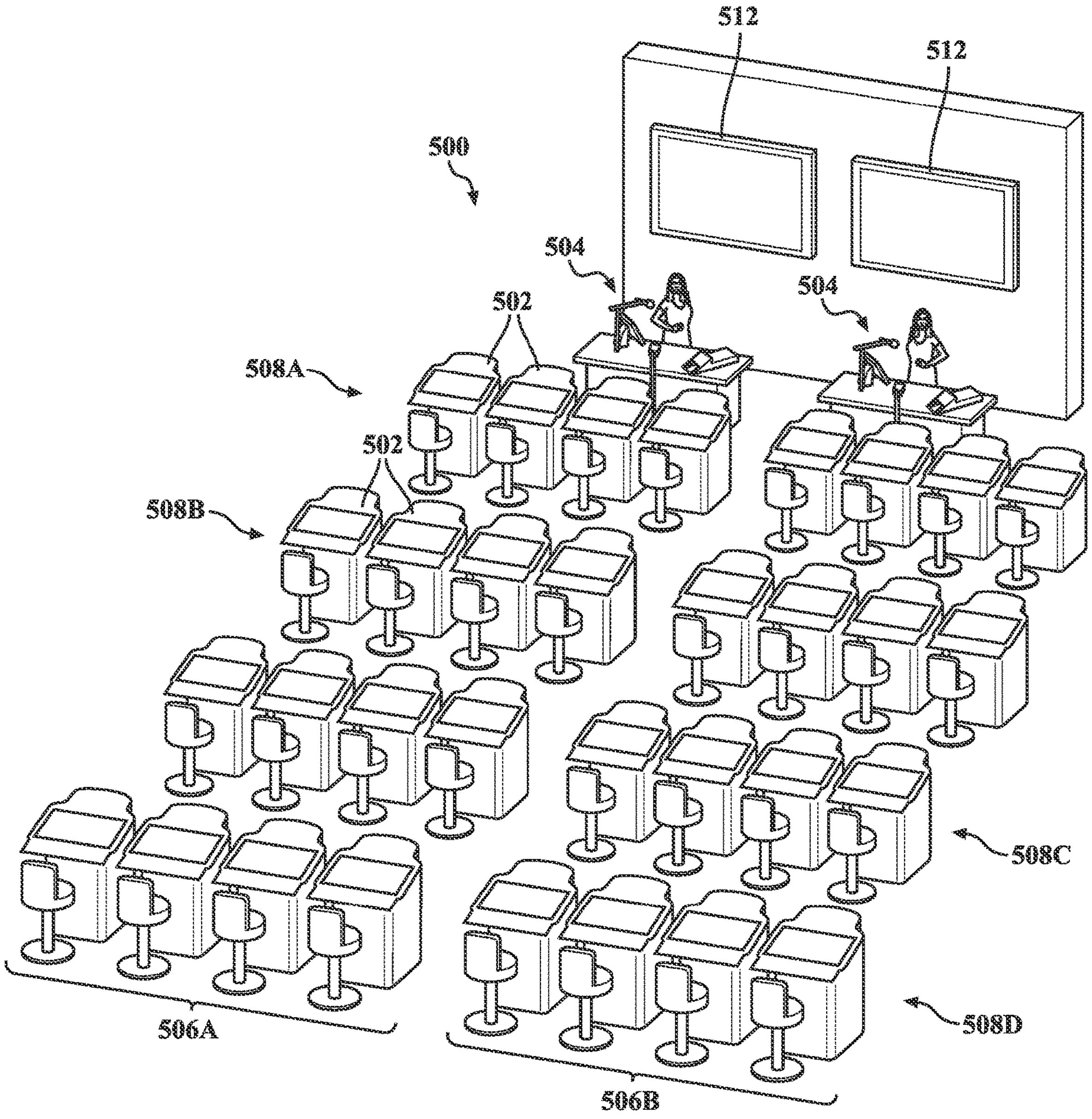
FIG. 10 is a graphic representation of a third venue or stadium at which a game or games may be provided with which a bonus game system according to the present invention may be used.

In the stadium environment 500 of FIG. 10, thirty-two player stations 502 are shown. The thirty-two player stations 502 are grouped into first and second player location groups 506A, 506B. Each of the player location groups 506A, 506B may be arranged into rows. In the illustrated embodiment, each player location group 506A, 506B includes first, second, third and fourth rows 508A, 508B, 508C 508D, each including four player stations 502 as shown.

Figure 11:
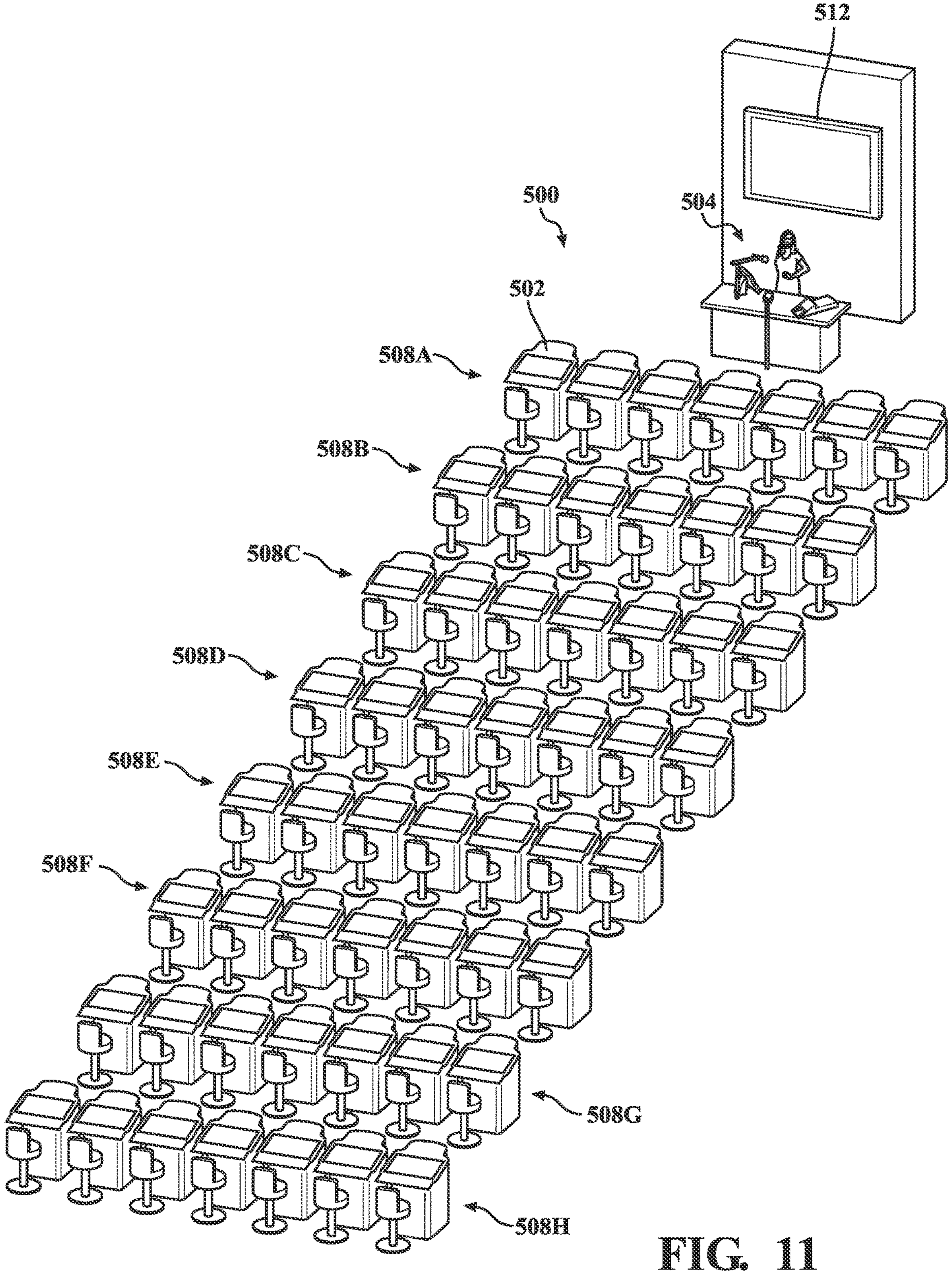
FIG. 11 is a graphic representation of a fourth venue or stadium at which a game or games may be provided with which a bonus game system according to the present invention may be used.

In the stadium environment 500 of FIG. 11, fifty-six player stations 502 are shown. The fifty-six player stations 502 are grouped into eight rows 508A, 508B, 508C, 508D, 508E, 508F, 508G, 508B of seven player stations 502 each.

It should be noted that the size of the stadium environment 500 is not limited for the purposes of the present invention in the number of player stations 502 or player station groups 505 (sections 510 and/or rows 508).

In one aspect of the present invention, the stadium bonus providing device 600 may include a bonus providing element or BPE 610, 620, 630, 640, 650, 660, 670, 680 distinct from the underlying game play. The stadium bonus providing device 600 enables a plurality of player unique benefits to an underlying game winning outcome or triggering outcome (see above). The stadium bonus providing device 600 used in a stadium environment 500 provides indications, to the players, of at least three individual random indicators. At least two of the at least three individual random indicators are displayed using the stadium bonus providing device 600 in a linear manner (see below). The three individual random indicators are (1) an identification of one of the player location groups 506, (2) an identification of one of the player stations 502 associated with the one of the player location groups 506, and (3) a parameter associated with a bonus award.

As discussed in more detail below, the parameter associated with a bonus award may be a community prize, a fixed amount, e.g., dollars or credits, a prize or a multiplier (of another award), a physical prize (car), or a progressive jackpot). A community prize may be awarded to all eligible players (in the arena), all eligible players in the selected group, section or row.

As discussed in more detail above, the stadium bonus providing device 600 may be triggered in response to a winning outcome or triggering event in the underlying game. In response to the occurrence of the winning outcome or triggering event in the underlying game, the stadium bonus providing device 600 is activated to randomly provide random outcomes for the three individual indicators. While specific embodiments of a stadium bonus providing device 600 configured to be used with a stadium or arena environment 500 are described, the stadium bonus providing device 600 may be used or combined with any of the features and/or limitations of the bonus providing elements described above.

In general, the stadium bonus providing device 600, in addition to providing an indication of the randomly selected parameter of the bonus award, may be used to provide an indication of a randomly selected one of the player location groups 506 and a randomly selected one of the player stations 502 within the selected one of the player location groups 506. The randomly selected parameter of the bonus award and either or both of (1) the randomly selected player location groups 506 and station 502 are linearly displayed on the stadium bonus providing device 600 using rotating elements and a pointer 602.

In some embodiments, the stadium bonus providing device 600 includes a single bonus providing element or BPE. The BPE consists of at least two elements and at least one pointer and may take different forms.

In some examples, the single BPE consists of a number of concentric rings that have a plurality of sub-elements. The concentric rings rotate about a central axis (see FIGS. 13-17 and 19-20). When the concentric rings are in a stopped position, a single pointer 604 may define the outcome of the BPE. In other the outcome of the BPE is defined by the sub-elements that are in-line or lined up with the pointer. Alternatively, each concentric ring or element may have an associated pointer (see pointers 604A, 604B in phantom in FIG. 12). In the alternative embodiment, the concentric ring and/or the associated pointer may rotate about the central axis.

In other embodiments, the stadium bonus providing device 600 may include more than one bonus providing element (BPE). Each BPE may have one or more ring and an associated pointer.

Figure 18:
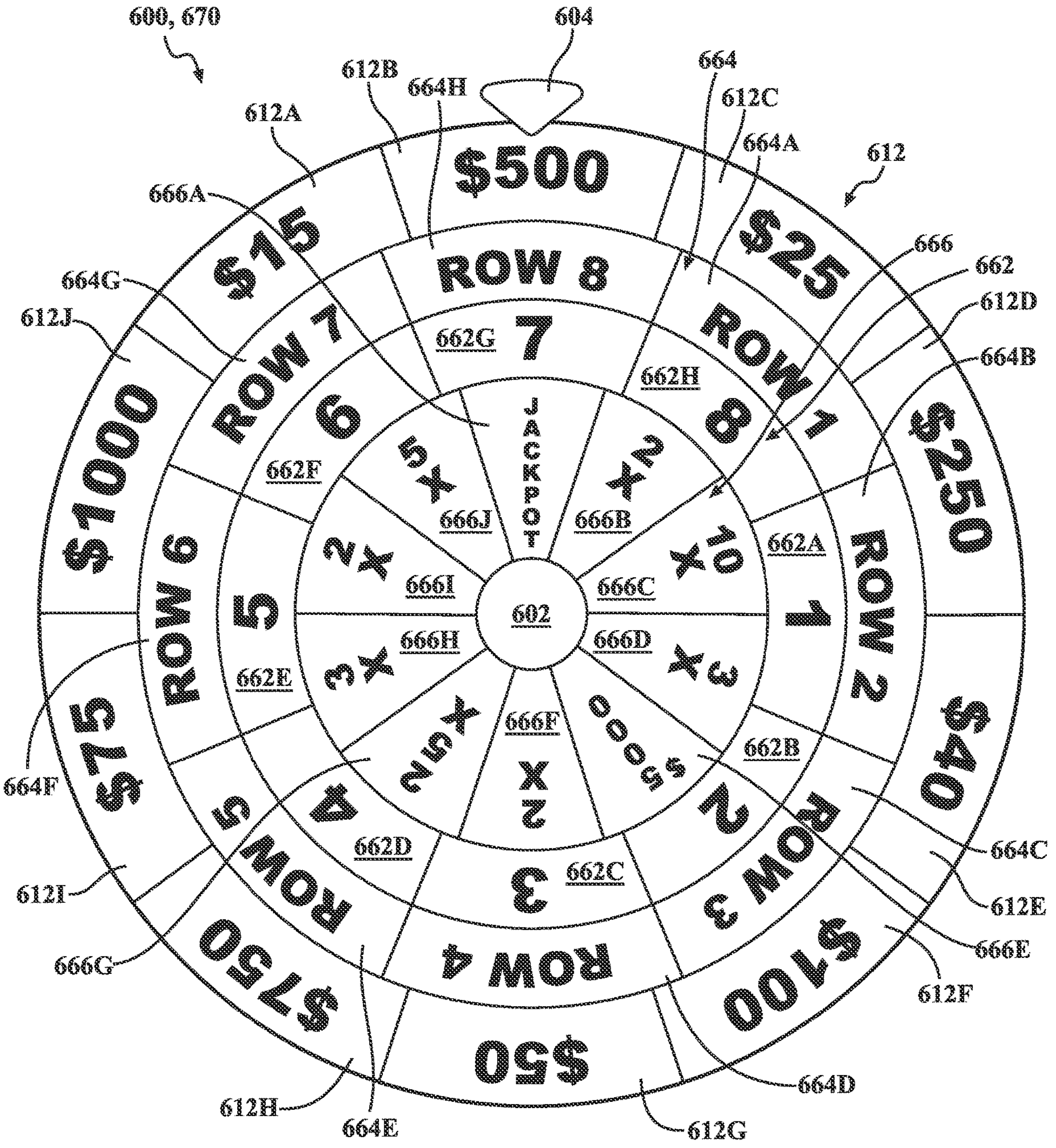
FIG. 18 a graphic representation of a seventh exemplary bonus providing element suitable for use in a stadium environment, according to an embodiment of the present invention.
Figure 19:
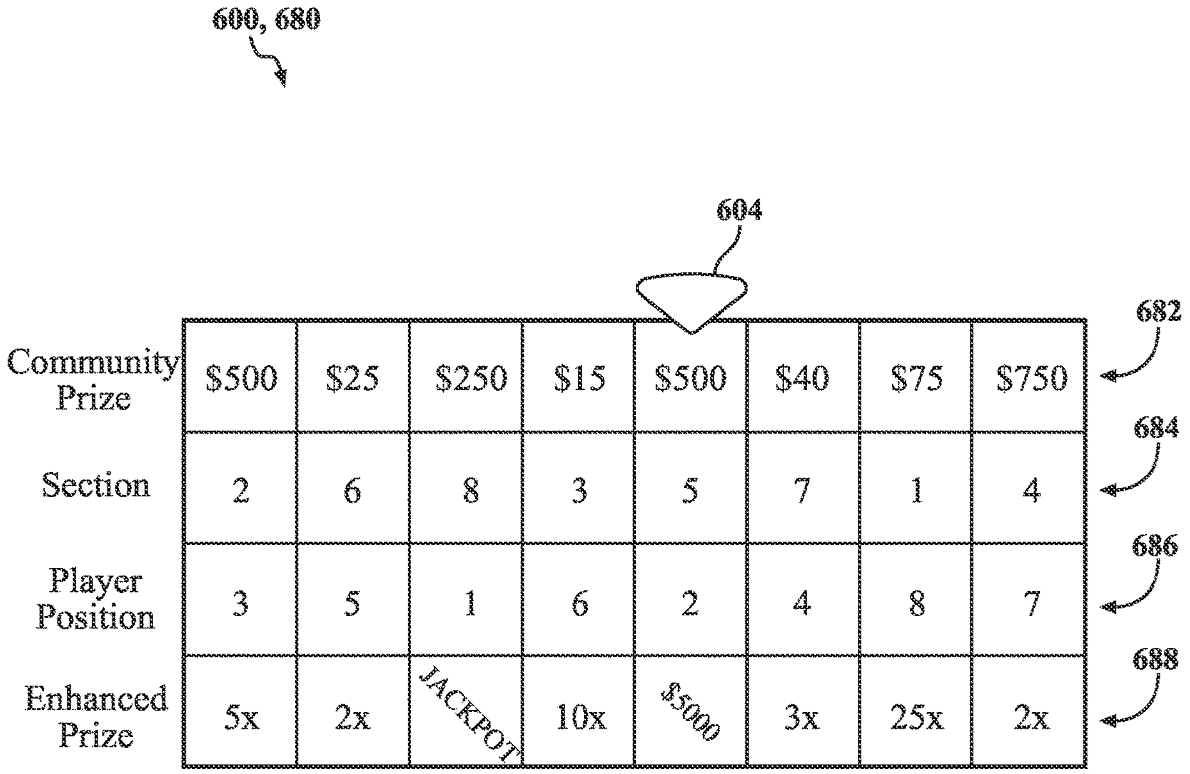
FIG. 19 a graphic representation of an eighth exemplary bonus providing element suitable for use in a stadium environment, according to an embodiment of the present invention.

In other embodiments, the BPE may consist of reels or wheels that rotate about a common axis 602 (see, for example, FIG. 18). The reels or wheels may be rotate either horizontally or vertically. When the BPE is actuated, the rings, reels or wheels may be rotated and stopped in a manner to increase anticipation in the players. In other words, the rings, reels or wheels may be rotated in different speeds and/or directions and may stopped independently, at different times. A bonus outcome may be indicated by the position of the elements and a pointer 604.

For purposes of explanation, the discussion below describes multiple embodiments of a single or unitary BPE. However, it should be noted that the elements of the BPEs described below may be implemented across multiple BPEs.

As discussed above the BPE's are used to provide or display the outcome of the number of random indicators. For instance a BPE may be used to provide an indication of:

a) at an identification of a randomly selected one of the groups;

b) an identification of a randomly selected one of the player stations associated with the randomly selected one of the groups; and, c) an identification of a randomly selected parameter associated with a bonus award.

The each of the random selected indicators may be randomly selected from a set of potential indicators, for example a set of the available groups (rows or section) available in the arena environment 500, a set of the available player stations 502 in each group and a set of available bonus award parameters.

Figure 12:
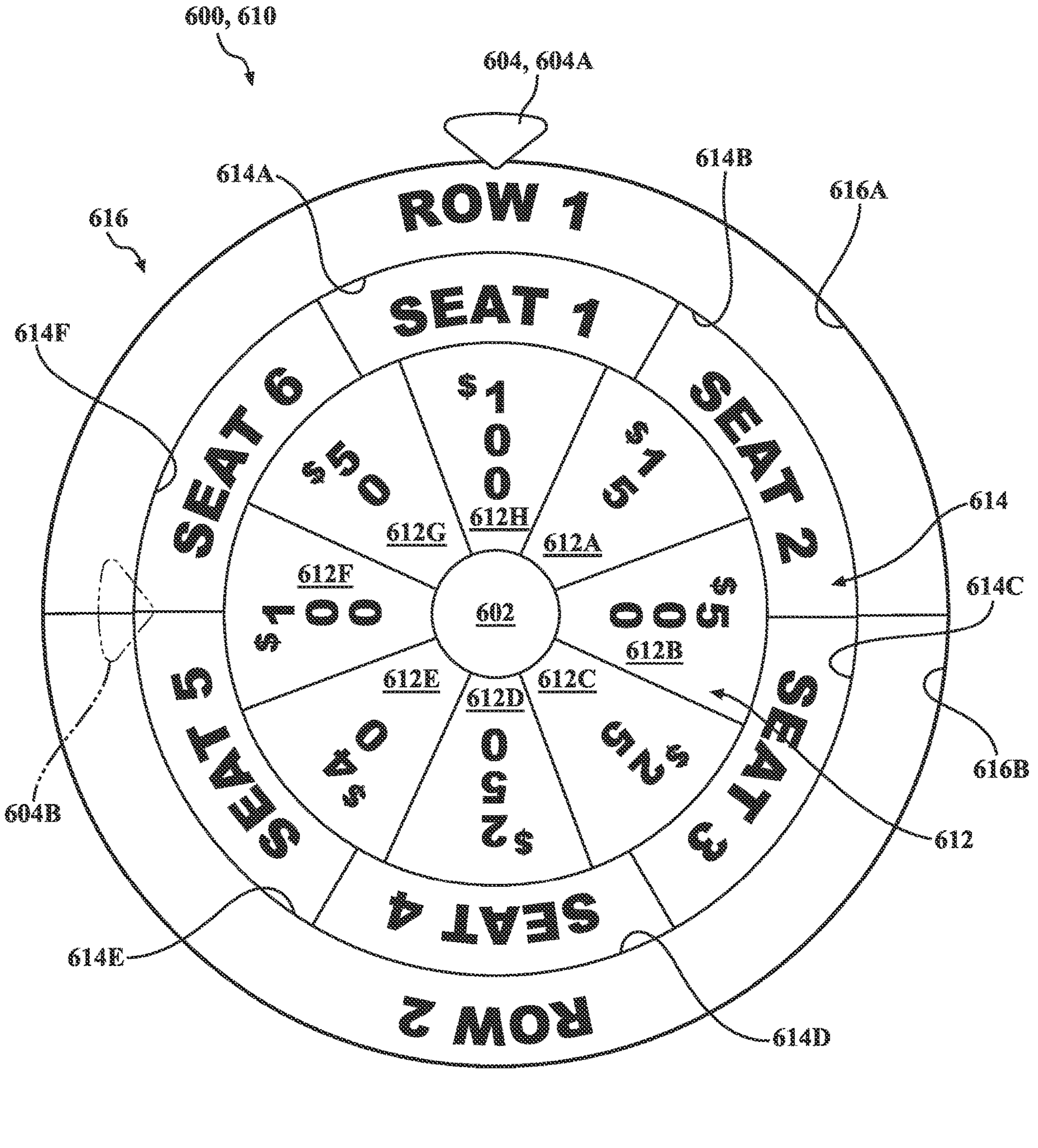
FIG. 12 a graphic representation of a first exemplary bonus providing element suitable for use in a stadium environment, according to an embodiment of the present invention.

In a first example, shown in FIG. 12, a first exemplary BPE 610 is shown. The first exemplary BPE 610 has a central axis 612, and first, second and third concentric rings 612, 614, 616.

The first concentric ring 612 is used to indicate the randomly selected parameter of the bonus award. In the illustrated embodiment, the first concentric ring 612 is divided into a plurality of ring segments 612A, 612B, 612C, 612D, 612E, 612F, 612G used to indicate the bonus award parameter, in this case, a fixed dollar amount that is provided to the player associated with the selected player station (see below), if occupied.

In addition, in order to be eligible to receive the bonus award, the player associated with the selected player station 502 has to have made the bonus wager (see above).

It should be noted that the first concentric ring 612 may be used to designate any randomly selected parameter of a bonus award (as described above). Additional rings may used in conjunction with the first concentric ring 612 to indicate other bonus awards or other parameters of the bonus award, for example, multipliers, additional fixed amounts and/or progressive jackpot awards. Some bonus awards may be provided to all players who are eligible, i.e., a community award, while other bonus awards may only be provided to one of the eligible players. A community prize may be awarded to all eligible players (in the arena), all eligible players in the selected group, section or row.

In general, the features of the BPE 600 used for stadium environments 500 to indicate a randomly selected player location group 506 and a randomly selected player station 502 within the randomly selected player location group 506 may be used within the examples discussed above.

Returning to FIG. 12, the second concentric ring 614 is divided into six ring segment 614A, 614B, 614C, 614D, 614E, 614F to indicate the randomly selected player station (or seat) 502 and the third concentric ring 616 is divided into ring segments 616A, 616B to indicate the randomly select player location group 506. When the BPE 600, 610 is activated, all three concentric rings 612, 614, 616 are rotated and then stopped to indicate the random outcome of the three indicators. The concentric rings 612, 614, 616 may start rotating simultaneously or consecutively. The concentric rings 612, 614, 616 may start and stop to rotate at the same time, or alternatively, start and stop in turn.

In the illustrated embodiment, if there is a player at the selected player station 502 and the player is participating in the bonus award, then the player is provided the award indicated by the first concentric ring 612. For instance, as shown in FIG. 12, the first, second and third concentric rings 612, 614, 616 have rotated and stopped. The outcome is defined by the linear positions of the first, second and third concentric rings 612, 614, 616 relative to the pointer 602. As shown, the first concentric ring 612 has been stopped to indicate a fixed award of $100. The second and third concentric rings 614, 616 are used to designate to a randomly selected player location group 506, in this embodiment, a row 508 and a player station 502 within the selected row 508.

The illustrated embodiment corresponds to the stadium environment 500 shown in FIG. 8, and thus, has two rows 508A, 508B, i.e., "ROW 1" and "ROW 2". In the illustrated embodiment, each row 508A, 508B has six player stations 502, i.e., "SEAT 1", "SEAT 2", "SEAT 3", "SEAT 4", "SEAT 5", and "SEAT 6". Thus, if there is a player in SEAT 2 of ROW 1 and the player is participating in the bonus award, then the player in SEAT 2 of ROW 1 is awarded $100. It should be noted that the present invention is not limited to any number of player location groups 506, rows 508 or sections 510 and/or the number of player stations 502 therein.

In the first exemplary embodiment of FIG. 12, the second and third concentric rings 614, 616 are used to designate or indicate the randomly selected player location group 506 (which in the illustrated embodiment is a row) and the randomly selected player station 502 in the selected player location group 506.

However, in other embodiments, a single ring may be used to indicate the randomly selected player location group 506 and player station 502.

Figure 13:
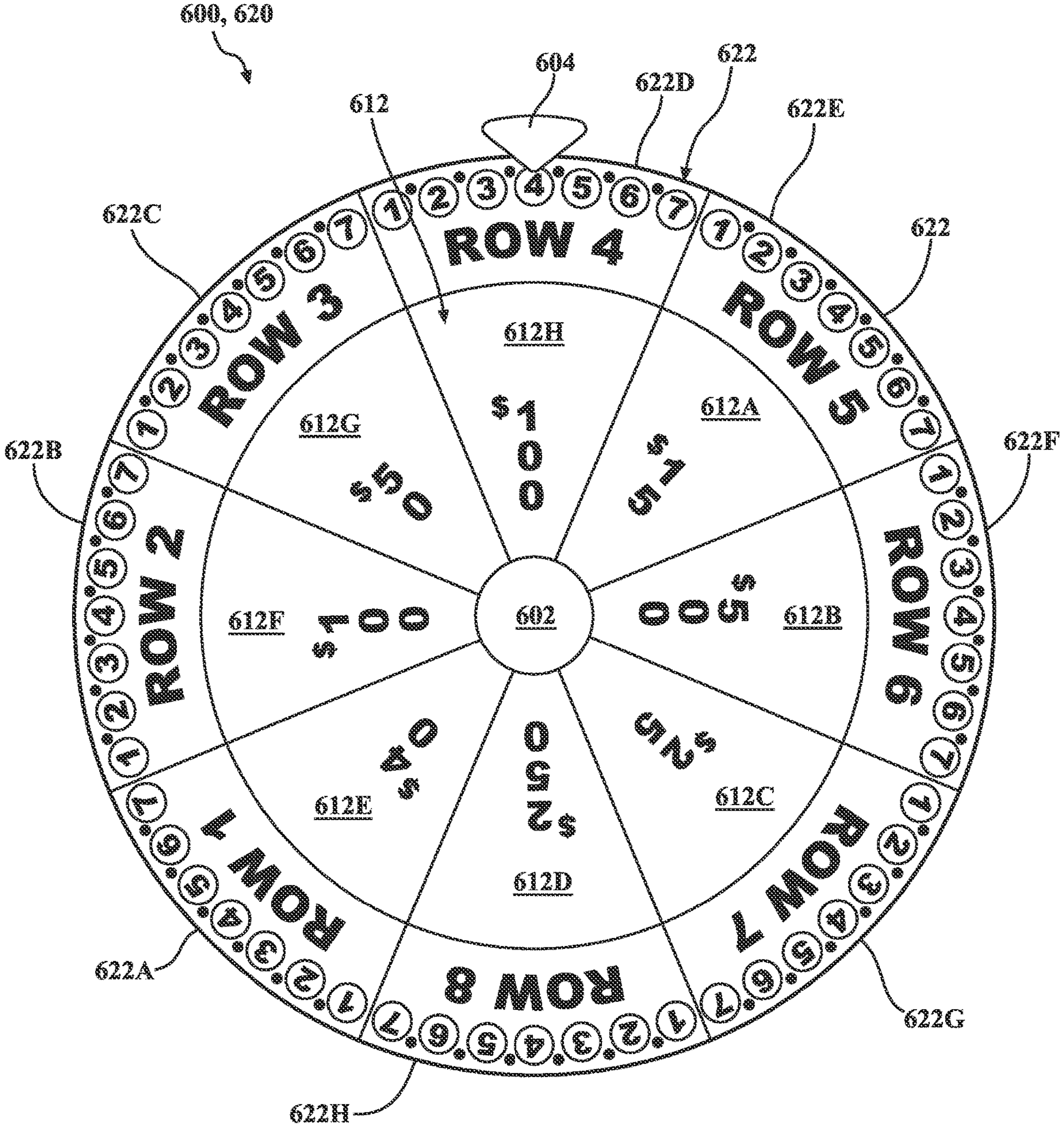
FIG. 13 a graphic representation of a second exemplary bonus providing element suitable for use in a stadium environment, according to an embodiment of the present invention.
Figure 14:
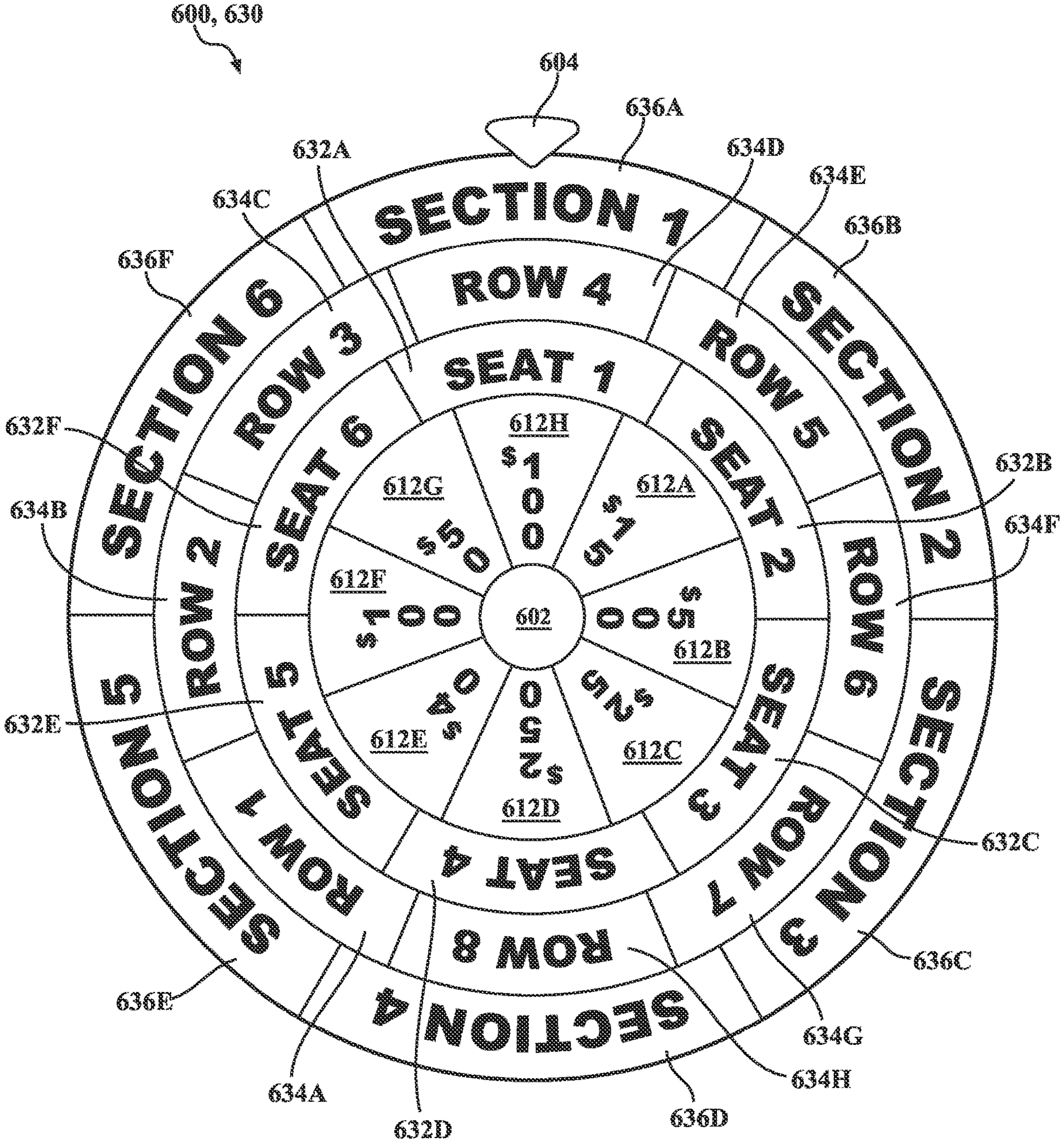
FIG. 14 a graphic representation of a third exemplary bonus providing element suitable for use in a stadium environment, according to an embodiment of the present invention.

For instance, with specific reference to FIG. 13 a second exemplary BPE 620 includes a first concentric ring 612 (similar to the first concentric ring 612 in the first exemplary BPE 620) to indicate the randomly selected parameter of the bonus award. The second exemplar BPE 620 also includes a combined concentric ring 622 to designate both a randomly selected group 506 and a randomly selected player station 502 in the selected player location group 506. In the illustrated embodiment, the second exemplary BPE 620 corresponds to the stadium environment 500 of FIG. 11 which includes fifty-six player stations 502 arranged in eight rows 508A, 508B, 508C, 508D, 508E, 508F, 508G, 508H of seven player stations 502 each.

In the illustrated embodiment, the combined concentric ring 622 is divided into eight segments 622A, 622B, 622C, 622D, 622E, 622F, 622G, 622H each corresponding to one of the eight rows 508A, 508B, 508C, 508D, 508E, 508F, 508G, 508H. In the illustrated embodiment, combined concentric ring 622 also includes a visual indication of a selected one of the seats or stations 502 in each player location group 506.

The visual indication may be of any number of different forms. For instance, an indicator of each one of the stations 502 may be briefly displayed such that station indicators are cycled. The cycling of the station indicators may halt such that only one station indicator is displayed to indicate the selected station. Alternatively, each station 502 may be assigned a specific color and the colors may be displayed and cycled through. The cycling of the station colors may halt such that only one station color is displayed to indicate the selected station 502.

In the illustrated embodiment, each segment 622A, 622B, 622C, 622D, 622E, 622F, 622G, 622G on the combined concentric ring 622 includes a station indicator, e.g., seat number, separated by pegs 624. When the combined concentric ring 622 is stationery, the pointed 604 is aligned with one of the segments 622A, 622B, 622C, 622D, 622E, 622F, 622G, 622G and one of the station indicators within the one of the segments 622A, 622B, 622C, 622D, 622E, 622F, 622G, 622G to indicate both the selected row 508A, 508B, 508C, 508D, 508E, 508F, 508G, 508H and the selected seat or station 502 within the selected row 508A, 508B, 508C, 508D, 508E, 508F, 508G, 508H.

In larger stadium environments such as the environment 500 shown in FIG. 10, the stadium environment 500 include a large number of player stations 502 are arranged into sections 510. Each section 510 may have a plurality of rows 508 which include a predetermined of player stations 502. In the illustrated embodiment of FIG. 10, thirty-two player stations 502 divided into first and second player location groups 506A, 506B. Each player location group 506A, 506B includes first, second, third and fourth rows 508A, 508B, 508C 508D, each including four player stations 502 as shown. In another embodiment, the BPE 600A may include a concentric ring for each of the section 510, the row 508 and the player station 502 in each row 508. It should be noted that the number of player location groups 506, rows 508 within each group, and seats or player stations 502 within each row may be any number. The number of player location groups 506, rows 508 within each player location group 506, and the number of seats or player stations 502 within each row 508 may be any suitable number.

In a third exemplary, a BPE 630 (FIG. 14) includes four concentric rings: a first concentric ring 612, a second concentric ring 632, a third concentric ring 634 and a fourth concentric ring 636. In the illustrated embodiment, the third exemplary BPE 630 is used with a stadium environment with 6 sections 510. Each section 510 has eight rows 508. Each row 508 has six player stations or seats 502. The first concentric ring 612 is similar to the first concentric ring 612 of the first and second exemplary BPE's 610, 614. In the illustrated embodiment, the second, third and fourth concentric rings 632, 634, 636 correspond to the player stations 502, the rows 508 and the sections 510, respectively. Thus, the second concentric ring 632 is divided into six segments 632A, 632B, 632C, 632D, 632E, 632F corresponding to the six stations 502 in each row 508; the third concentric ring 634 is divided into eight segments 634A, 634B, 634C, 634D, 634E, 634F, 634G, 634H; and the third concentric ring 636 is divided into six segments 634A, 634B, 634C, 634D, 634E, 634F corresponding to the six sections 510. As shown, when the first, second, third and fourth concentric rings 612, 634, 636, 638 are in a stopped or stationery position, the award indicated by the first concentric ring 612 may be awarded to the player (if any and eligible) in the selected player station 502 of the selected row 508 in the selected stations 510 that are aligned with the pointer 604.

Figure 15:
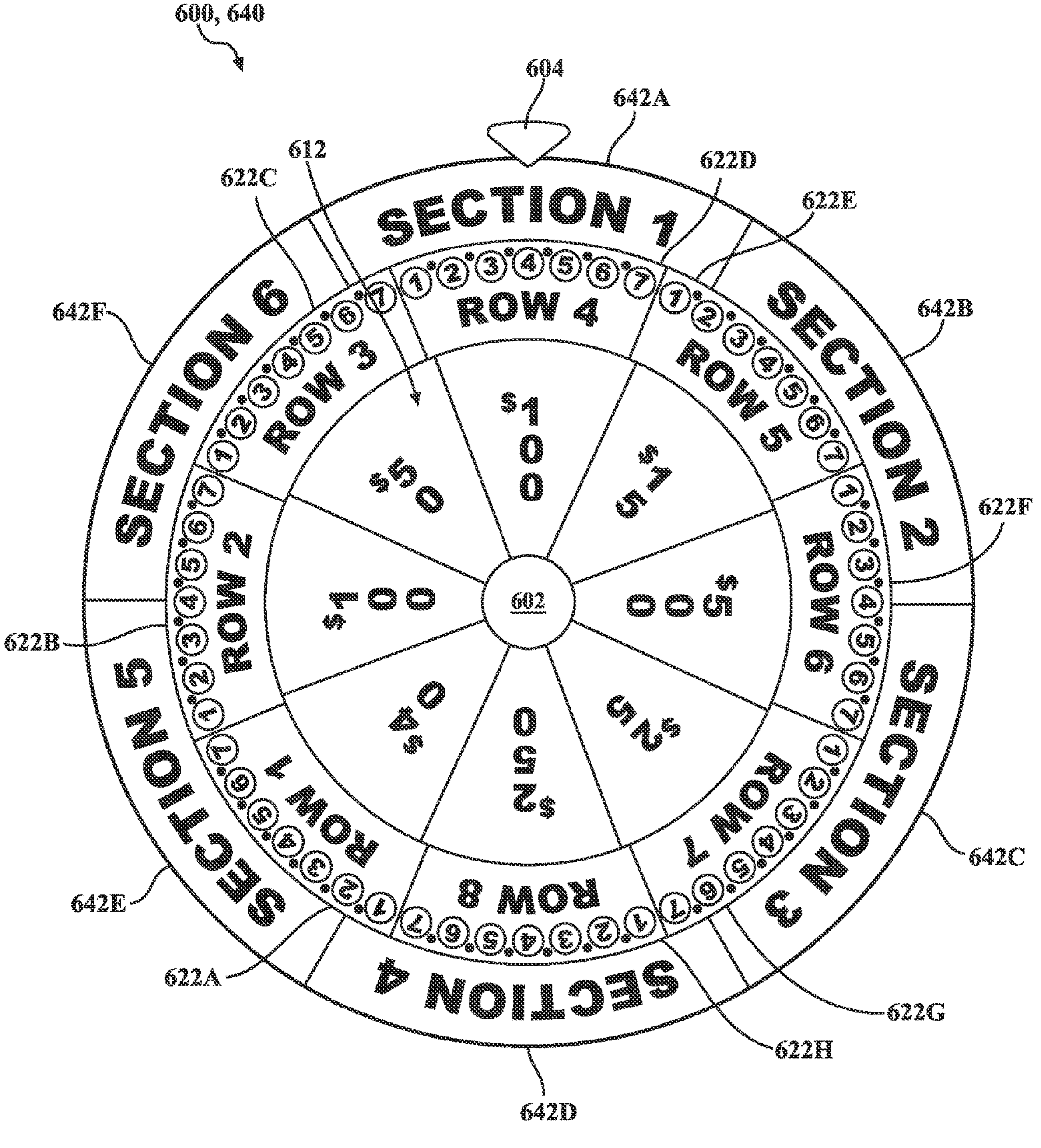
FIG. 15 a graphic representation of a fourth exemplary bonus providing element suitable for use in a stadium environment, according to an embodiment of the present invention.

In a fourth BPE 640 shown in FIG. 15, a first concentric ring 612 and a combined concentric ring 622 are used to designate the bonus award and a randomly selected row 508 and player station 502, respectively, in a manner similar to the second exemplary BPE 620. The fourth exemplary BPE 620 includes an outer concentric ring 642 that is used to designate a randomly selected section 510. In the illustrated embodiment, the stadium environment 500 includes six sections 510A, 510B, 510C, 510D, 510E, 510F each having eight rows 508 of seven player stations 502. Thus, the outer concentric ring 642 is divided into six sections 642A, 642B, 642C, 642D, 642D, 642E as shown.

Figure 16:
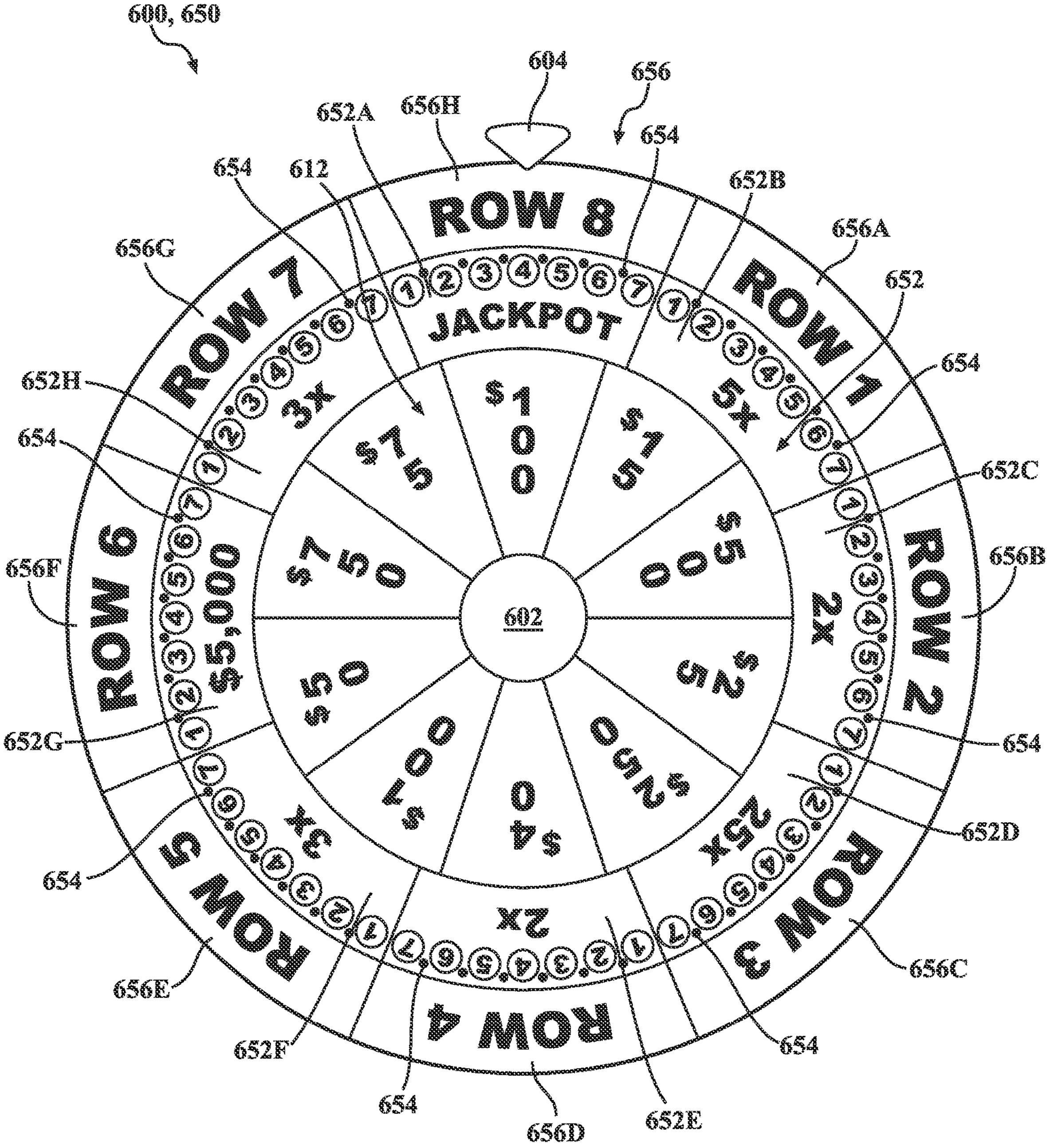
FIG. 16 a graphic representation of a fifth exemplary bonus providing element suitable for use in a stadium environment, according to an embodiment of the present invention.

With reference to FIG. 16, a fifth BPE 650 is shown. The fifth BPE 650 is similar to the BPE shown in FIG. 1 configured to work in an arena environment 500. The fifth BPE 650 includes an outer concentric to designate a randomly selected row 508.

A first concentric ring 612 of the fifth BPW 650 is used to indicate a fixed award (shown as a fixed amount) that may be awarded to all eligible players, i.e., a community award. A community prize may be awarded to all eligible players (in the arena), all eligible players in the selected group, section or row. The fifth BPE 650 also includes a combined concentric ring 652. The combined concentric ring 652 may be utilized to demonstrate the outcome of two individual random indicators: one of which is related to a randomly selected parameter of an associated bonus award and the other of which is related to a randomly selected player station 502. In the illustrated embodiment, the combined concentric ring 652 includes eight segments 652A, 652B, 652C, 652D, 652E, 652F, 652G, 652H corresponding to eight different bonus award parameters that may be awarded to only one of the eligible players. For instance, in one embodiment the randomly selected bonus award parameter is only awarded to the player associated with player station 502 indicated by the third and fourth rings 654, 656. In the illustrated embodiment, the bonus award parameters on the combined concentric ring 652 include a fixed amount award or a JACKPOT (both of which may be provided via progressive pools) and a number of multipliers that are applied to the to the community award (for the player associated with the triggering event only.

In addition, each segment 652A, 652B, 652C, 652D, 652E, 652F, 652G, 652H may include a player station indicator ("1"-"7") separated by pegs 654. The player station indicators may be used in indicate a randomly selected player station 502 in a selected row. The fifth BPE 650 includes a second or outer concentric ring 656 that may be used to indicate a randomly selected row. In the illustrated embodiment, the environment 500 include eight rows 508, so the outer concentric ring 656 has eight segments 656A, 656B, 656C, 656D, 656E, 656F, 656G, 656H.

Figure 17:
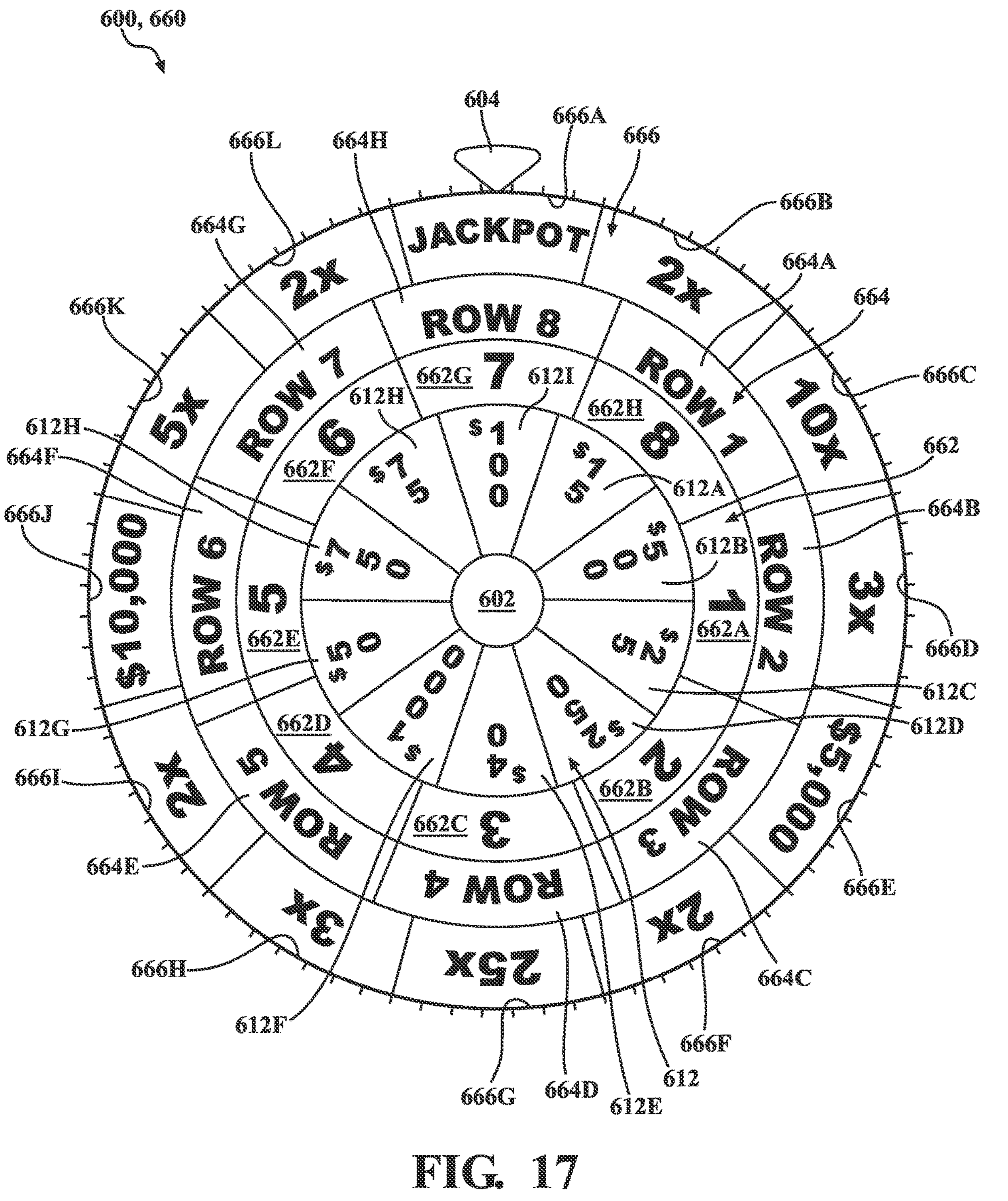
FIG. 17 a graphic representation of a sixth exemplary bonus providing element suitable for use in a stadium environment, according to an embodiment of the present invention.

With reference to FIG. 17, a sixth BPE 660 is shown. The sixth BPE 660 is similar the BPE of FIG. 2 adapted to an arena environment 500. The sixth BPE 660 includes a first concentric ring 612 of the sixth BPW 660 is used to indicate a community award (shown as a fixed amount). The sixth BPE 660 also include second, third and fourth rings 662, 664, 666. The sixth BPE 660 is similar to the BPE shown in FIG. 2 adapted for use in an arena 500. The second and third rings 662, 664 are used to indicate a randomly selected player station 502 in a randomly selected row 508. In the BPE 660 of FIG. 17, the environment 500 includes eight rows 508, each having eight player stations 502. The second ring 662 is divided into eight segments 662A, 662B, 662C, 662D, 662E, 662F, 662G, 662H corresponding to the eight player stations 502 (in each row). The third ring 664 is divided into eight segments 662A, 662B, 662C, 662D, 662E, 662F, 662G, 662H corresponding to the eight rows 508.

The fourth ring 666 may be used to indicate a randomly selected bonus parameter this is only provided to the player (if any, if eligible) at the player station 502 in the row 508 indicated by the second and third rings 662, 664. In the illustrated embodiment, the fourth ring 666 is divided into twelve segments 666A, 666B, 666C, 666D, 666E, 666F, 666G, 666H, 666I, 666J, 666K, 666L. As shown, each of the segments 666A, 666B, 666C, 666D, 666E, 666F, 666G, 666H, 666I, 666J, 666K, 666L of the fourth ring 666 has a bonus parameter award that may be provided only to an eligible player (if any) at the player station 502 indicated by the second and third rings 662, 664. As shown, the bonus parameter award represented in the fourth ring 666 may be a fixed award, a (progressive) jackpot award or a multiplier (applied to the community award indicated by the first concentric ring 612).

The concentric rings of the BPE may be in any order. For example, in the seventh exemplary BPE 670 shown in FIG. 18, the rings of the sixth BPE 660 have been reordered. For simplicity, the re-ordered rings in the seventh exemplary BPE 670 have been numbered in a manner similar to the corresponding rings in the sixth exemplary BPW 660.

As discussed above, the bonus providing device 600 may include a bonus providing element that is composed of horizontal reels (or wheel). In the eighth exemplary BPE 680 shown FIG. 19, first, second, third and fourth horizontal reels 682, 684, 686, 688 are shown. In the illustrated embodiment, the first horizontal reel 682 may be used to indicate a randomly selected community award, that is shown as a fixed award. The second horizontal reel 684 may be used to indicate a randomly selected section 510 (in the stadium environment 500). The third horizontal reel 686, may be used to indicate a randomly selected player position (player station or seat) 502 in the randomly selected section 508.

In the illustrated embodiment, the fourth horizontal reel 688 may be used to indicate a randomly selected bonus award parameter that is only provided to the player (if any) in the selected player station or seat 502 indicated by the second and third horizontal reels 684, 686. In the illustrated embodiment, the bonus award parameters on the fourth horizontal reel 688 includes multipliers (applied to the community award), a fixed amount and a (progressive) jackpot.

Figure 20A:
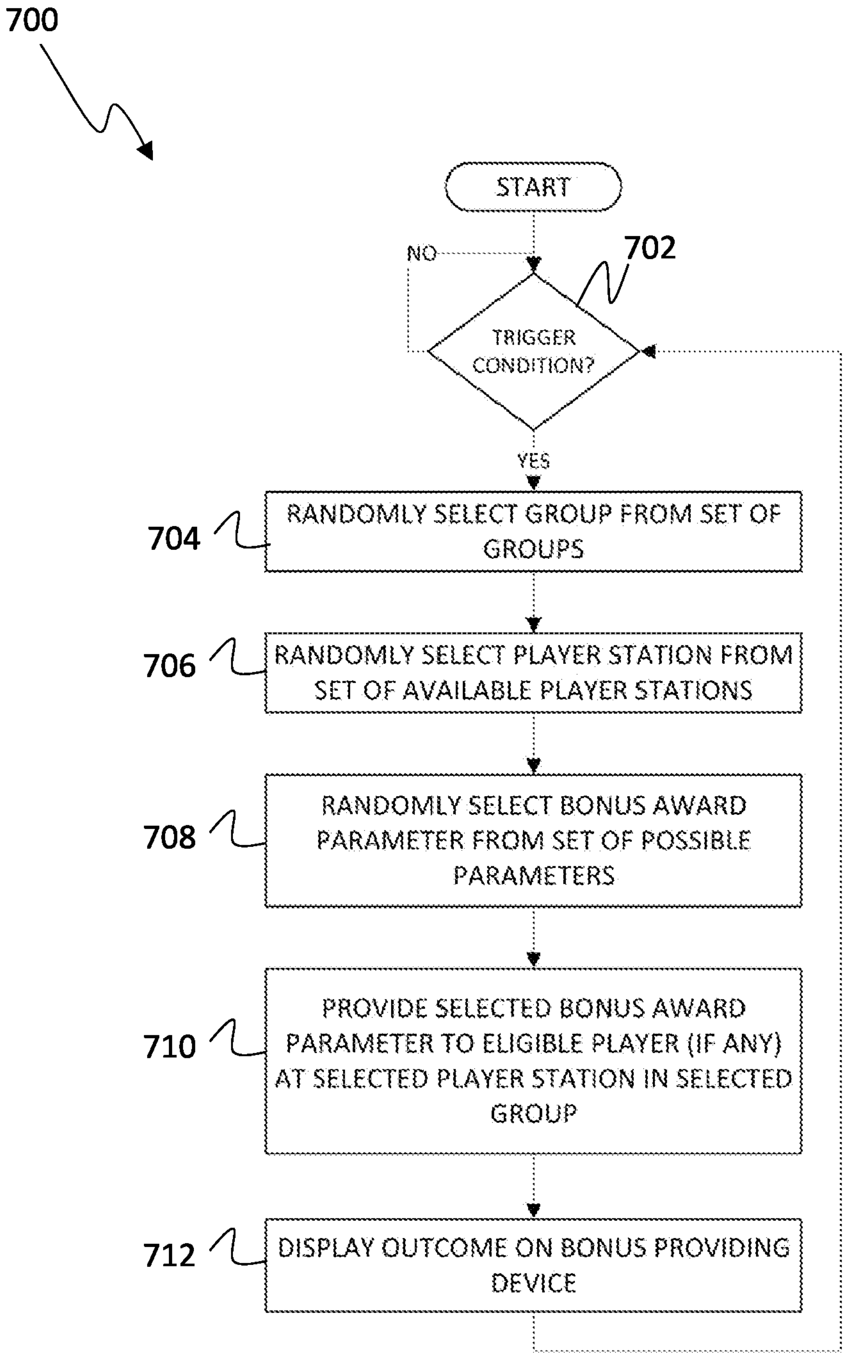
FIG. 20A is a first flow diagram of a method for providing a bonus providing element for use in a stadium environment, according to a first embodiment of the present invention.
Figure 20B:
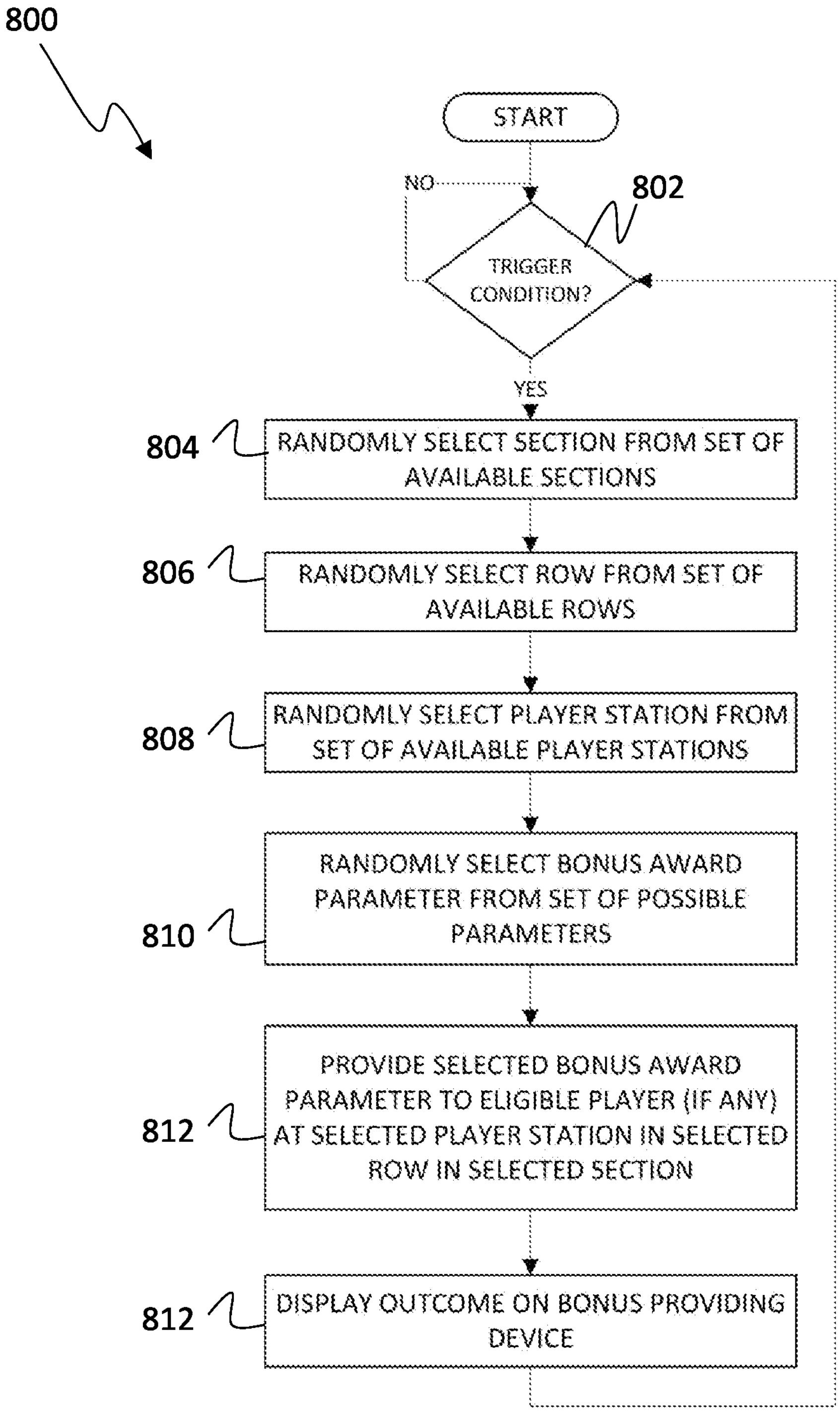
FIG. 20B is a second flow diagram of a method for providing a bonus providing element for use in a stadium environment, according to a second embodiment of the present invention.
Figure 20C:
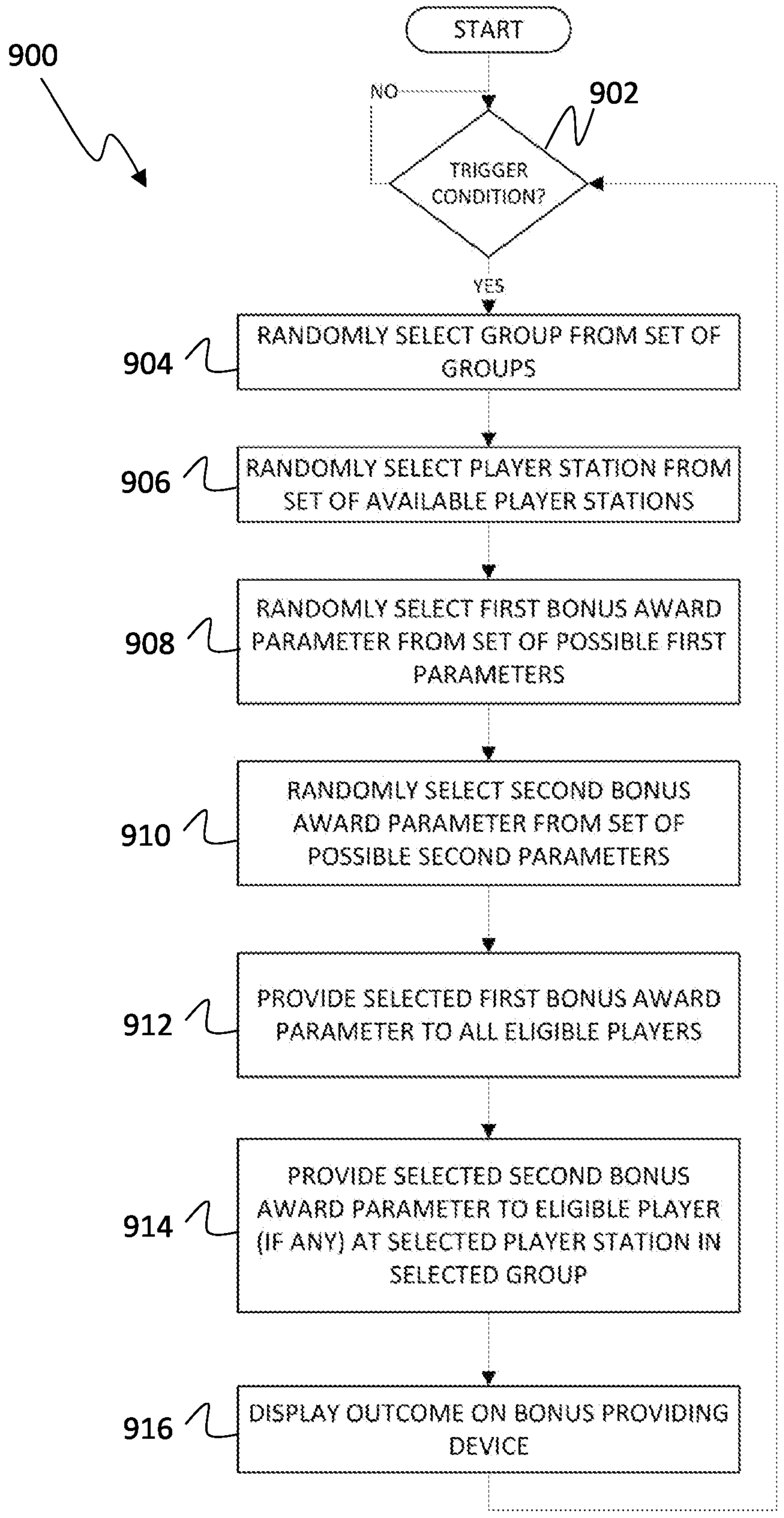
FIG. 20C is a third flow diagram of a method for providing a bonus providing element for use in a stadium environment, according to a third embodiment of the present invention.

With reference to FIG. 20A-20C, the controller 302 may be configured to implement a computer based method 700, 800, 900 associated with a bonus providing element 610, 620, 630, 640, 650, 660, 670, 680 of the present invention.

With specific reference to FIG. 20A, in a first method 700, a BPE 610, 620, 630, 640, 650, 660, 670, 680 is used to provide an indication of a bonus award parameter to an eligible player located at a selected player station 502 within a selected player location group 506. In a first decision block 702, if a trigger condition or triggering outcome in the base game has occurred then the method 700 proceeds to a first step 704. In the first step 704, a player location group 506 is randomly selected from a set of available groups 506. The arena environment 500 may be divided into a number of player location groups 506. Each player location group 506 has a plurality of player stations 502. As discussed above, a player location group 506 may be a section 510 or a row 508. Sections 510 may be further divided into rows 508.

In a second step 706, a player station 502 within the selected player location group 506 is randomly selected from a set of available player stations 502. In a third step 708, a bonus award parameter is randomly selected from a set of available bonus award parameters. In a fourth step 710, the bonus award parameter may be provided to the eligible player that is associated with the selected player station 502 in the selected player location group 506. As discussed above, in one embodiment only eligible players are eligible for the bonus award parameters. An eligible player is a player who is playing in the base game and has paid an additional wager to be eligible for the bonus game.

In the fifth step 712, the BPE 610, 620, 630, 640, 650, 660, 670, 680 is used to provide an indication to the players of the award of the bonus player parameter (see above). Thereafter, the first method 700 returns to the first decision block 702.

It should be noted that the steps of the first method 700 may be performed in any suitable order.

With specific reference to FIG. 20B, in a second method 800, a BPE 610, 620, 630, 640, 650, 660, 670, 680 is used to provide an indication of a bonus award parameter to an eligible player located at a selected player station 502 within a selected row 508 within a selected section 510. In a first decision block 802, if a trigger condition has occurred then the method 800 proceeds to a first step 804.

In the first step 804, a section 510 is randomly selected from a set of available sections 510. The arena environment 500 may be divided into a number of sections 510. Each section 510 includes a plurality of rows 508. Each row 508 has a plurality of player stations 502.

In a second step 806, a row 508 within the selected section 510 is randomly selected from a set of available player rows 508. In a third step 808, a player station 502 within the selected row 508 is randomly selected.

In a fourth step 810, a bonus award parameter is randomly selected from a set of available bonus award parameters. In a fifth step 812, the bonus award parameter may be provided to the eligible player that is associated with the selected player station 502 in the selected row 508 within the selected section 510. As discussed above, in one embodiment only eligible players are eligible for the bonus award parameters. An eligible player is a player who is playing in the base game and has paid an additional wager to be eligible for the bonus game.

In the sixth step 814, the BPE 610, 620, 630, 640, 650, 660, 670, 680 is used to provide an indication to the players of the award of the bonus player parameter (see above). Thereafter, the second method 800 returns to the first decision block 802.

It should be noted that the steps of the second method 800 may be performed in any suitable order.

With specific reference to FIG. 20C, in a third method 900, a BPE 610, 620, 630, 640, 650, 660, 670, 680 is used to provide an indication of a first bonus award parameter and a second bonus award to one or more eligible players. In a first decision block 902, if a trigger condition has occurred then the third method 900 proceeds to a first step 904.

In the first step 904, a player location group 506 is randomly selected from a set of available player location groups 506. The arena environment 500 may be divided into a number of player location groups 506. Each player location group 506 has a plurality of player stations 502. As discussed above, a player location group 506 may be a section 510 or a row 508. Sections 510 may be further divided into rows 508.

In a second step 906, a player station 502 within the selected player location group 506 is randomly selected from a set of available player stations 502. In a third step 908, a first bonus award parameter is randomly selected from a set of available first bonus award parameters. In a fourth step 910, a second bonus award parameter is randomly selected from a set of available second bonus award parameters.

In the illustrated embodiment, the first bonus award parameter is a community award that is award to all eligible players. The second bonus parameter is a second bonus award that is provided only to an eligible player associated with the selected player station 502. For instance, the second bonus parameter may be, for example, a fixed amount, a jackpot or progressive jackpot or a multiplier applied to the community award (for the eligible player associated with the selected player station 502).

In a fifth step 912, the first bonus award parameter may be provided to all eligible players. In a sixth step 914, the second bonus award parameter is provided to the eligible player that is associated with the selected player station 502 in the selected player location group 506.

In the seventh step 916, the BPE 610, 620, 630, 640, 650, 660, 670, 680 is used to provide an indication to the players of the award of the first and second bonus player parameters (see above). Thereafter, the third method 900 returns to the first decision block 902.

It should be noted that the steps of the third method 900 may be performed in any suitable order.

It will be appreciated that aspects of the disclosure may be used in combination or apart from one another. For example, the BPE described above might be implemented relative to a different method and system for activating the BPE than just described. Further, the method and system for activating a BPE might be used with other types of BPE. For example, the method and system for activating the BPE might be used relative to a wheel which simply selects a single award for one or more players (such as one or more of a fixed amount or progressive jackpot), rather than a first award and a second award, or relative to other elements for displaying or indicating an additional award (such as beyond awards defined by the underlying game itself).

To enhance security at casinos, more and more table games, bonus events and secondary games use electronic wagering systems, such as player input is controls, video display screens and a processor with memory configured to store and receive credit, and debit and credit accrual in credit. The gaming system may operate as an electronic device (table, console, bank of games machines, etc.). Each table and/or each player position may have a value-in-value-out component selected from the group consisting of a currency validator with a currency scanner 20 and currency-advancing motor, a ticket-in-ticket-out reader and printer combination, a magnetic or bar code reader accessible through an input opening, and an electronic wallet near-field communication reader.

The electronic alternative of this technology may be provided by components similar to or identical to a standard EGM, with software and display images in memory that can implement a reproduction or duplication of the operation of a physical device.

Other options are within the scope of the disclosure such as automated highlighting of individual random outcomes on the bonus device, and the like.

It will be understood that the above-described arrangements of apparatus and the method there from are merely illustrative of applications of the principles of this disclosure and many other examples and modifications may be made without departing from the spirit and scope of the disclosure as defined in the claims.

What is claimed is:

1. A system for implementing a bonus providing element distinct from underlying game play, comprising:

a display located apart from a plurality of player stations arranged in groups, the display arranged in a position in front of the player stations such that the display is viewable by players at different ones of the player stations;

a controller coupled to the display and configured to controllably display the bonus providing element on the display; and, at least one memory for storing data associated with the bonus providing element, the bonus providing element including first, second, and third concentric rings centered on an axis and at least one pointer, the data associated with the bonus providing element including:

a) an identification of the groups;

b) an identification of the player stations associated with each group; and, c) an identification of a plurality of parameters associated with a bonus award, the controller, in response to a triggering event, configured to causing the display to:

rotate the first concentric ring and/or the at least one pointer to provide an indication of a randomly selected one of the plurality of parameters associated with the bonus award, rotate the third concentric ring and/or the at least one pointer to provide an indication of a randomly selected one of the groups of player stations, and, rotate the second concentric ring and/or the at least one pointer to provide an indication of a randomly selected player station within the randomly selected one of the groups of player stations.

2. The system, as set forth in claim 1, wherein the groups are rows within an arena environment.

3. The system, as set forth in claim 1, wherein the groups are sections within an arena environment.

4. The system, as set forth in claim 1, wherein the display is a video display and the bonus providing element is a virtual bonus providing element.

5. The system, as set forth in claim 1, wherein the bonus providing element is a physical bonus providing element wherein each of the first, second, and third concentric rings is configured to be rotated independently.

6. The system, as set forth in claim 1, wherein the randomly selected one of the groups is selected from the groups of player stations, the randomly selected one of the player stations is selected from the player stations in the selected one of the groups of player stations, and the randomly selected parameter is selected from a set of bonus award parameters.

7. The system, as set forth in claim 6, wherein the set of bonus award parameters are fixed awards.

8. The system, as set forth in claim 7, wherein a fixed award associated with the randomly selected bonus award parameter is awarded to an eligible player located at the randomly selected player station in the randomly selected group.

9. The system, as set forth in claim 7, wherein a selected fixed award is provided all eligible players.

10. A method associated with a bonus providing element distinct from underlying game play the bonus providing element including first, second, and third concentric rings centered on an axis and at least one pointer, the method including the steps of:

providing a display located apart from a plurality of player stations arranged in groups, the display arranged in a position in front of the player stations such that the display is viewable by players at different ones of the player stations;

providing at least one memory for storing data associated with the bonus providing element, the bonus providing element including first, second, and third concentric rings centered on an axis and at least one pointer, the data associated with the bonus providing element including an identification of the groups, an identification of the player stations associated with each group; and an identification of a plurality of parameters associated with a bonus award, and, providing a controller coupled to the display and configured to controllably display the bonus providing element on the display, the controller configured to detect an occurrence of a trigger condition and to responsively cause the display to:

rotate the first concentric ring and/or the at least one pointer to provide an indication of a randomly selected one of the plurality of parameters associated with the bonus award;

rotate the third concentric ring and/or the at least one pointer to provide an indication of a randomly selected one of the groups of player stations; and rotate the second concentric ring and/or the at least one pointer to provide an indication of a randomly selected player station within the randomly selected one of the groups of player stations.

11. The method, as set forth in claim 10, wherein the groups are rows within an arena environment.

12. The method, as set forth in claim 10, wherein the groups are sections within an arena environment.

13. The method, as set forth in claim 10, wherein the display is a video display and the bonus providing element is a virtual bonus providing element.

14. The method as set forth in claim 10, wherein the bonus providing element is a physical bonus providing element, wherein each of the first, second, and third concentric rings is configured to be rotated independently.

15. The method, as set forth in claim 10, wherein the randomly selected one of the groups is selected from the groups of player stations, the randomly selected one of the player stations is selected from the set of player stations in the selected one of the groups of player stations, and the randomly selected bonus parameter is selected from a set of bonus award parameters.

16. The method, as set forth in claim 15, wherein the set of first bonus award parameters are fixed awards.

17. The method, as set forth in claim 16, wherein a fixed award associated with the randomly selected bonus award parameter is awarded to all eligible players.

18. The method, as set forth in claim 10, wherein a selected fixed award is provided all eligible players.

19. The method, as set forth in claim 10, where the bonus providing element includes first, second, and third horizontal reels and at least one pointer.

* * * * *